(12) United States Patent
Kim et al.

(10) Patent No.: US 11,954,626 B2
(45) Date of Patent: Apr. 9, 2024

(54) REFRIGERATOR AND METHOD FOR DISPLAYING USER INTERFACE ON REFRIGERATOR, USER TERMINAL, AND METHOD FOR PERFORMING FUNCTION IN USER TERMINAL

(71) Applicant: SAMSUNG ELECTRONICS CO., LTD., Suwon-si (KR)

(72) Inventors: Jae-hong Kim, Yongin-si (KR); Myung-jin Eom, Seoul (KR); Ik-soo Kim, Seoul (KR); Sang-kyung Lee, Anyang-si (KR); Hee-won Jin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 615 days.

(21) Appl. No.: 17/046,935

(22) PCT Filed: May 4, 2018

(86) PCT No.: PCT/KR2018/005179
§ 371 (c)(1),
(2) Date: Oct. 12, 2020

(87) PCT Pub. No.: WO2019/198865
PCT Pub. Date: Oct. 17, 2019

(65) Prior Publication Data
US 2021/0048242 A1    Feb. 18, 2021

(30) Foreign Application Priority Data
Apr. 13, 2018 (KR) .................. 10-2018-0043575

(51) Int. Cl.
*F25D 29/00* (2006.01)
*G06F 9/451* (2018.01)
(Continued)

(52) U.S. Cl.
CPC ...... *G06Q 10/06316* (2013.01); *F25D 29/005* (2013.01); *G06F 9/453* (2018.02);
(Continued)

(58) Field of Classification Search
CPC ......... F25D 29/005; G06F 9/453; G06F 9/542
See application file for complete search history.

(56) References Cited

U.S. PATENT DOCUMENTS 7,304,275 B2    12/2007    Chun et al.
9,269,133 B2     2/2016    Cho et al.
(Continued)

FOREIGN PATENT DOCUMENTS

CN    1892519       1/2007
CN    101126571     2/2008
(Continued)

OTHER PUBLICATIONS

Hou, Recommend menu and recommend method, system and the refrigerator of culinary art, 2017, Full Document (Year: 2017).*
(Continued)

*Primary Examiner* — Nael N Babaa
(74) *Attorney, Agent, or Firm* — Nixon & Vanderhye, P.C.

(57) ABSTRACT

Disclosed are a refrigerator and a method for displaying a user interface on the refrigerator, a user terminal, and a method for performing a function in the user terminal. The refrigerator according to the present disclosure may include: a storage chamber storing food therein; a temperature detection unit configured to detect the internal temperature of the storage chamber; a cooling unit configured to supply cold air to the storage chamber; a camera configured to photograph food in the storage chamber; a communication unit configured to communicate with a user terminal; a display; at least one processor electrically connected to the temperature
(Continued)

detection unit, the camera, the cooling unit, and the communication unit; and a memory electrically connected to the at least one processor.

16 Claims, 28 Drawing Sheets

(51) Int. Cl.
  *G06F 9/54* (2006.01)
  *G06F 18/22* (2023.01)
  *G06Q 10/0631* (2023.01)
  *G06V 20/64* (2022.01)

(52) U.S. Cl.
  CPC .............. *G06F 9/542* (2013.01); *G06F 18/22* (2023.01); *G06V 20/64* (2022.01)

(56) References Cited

U.S. PATENT DOCUMENTS

| | | | |
|---|---|---|---|
| 10,724,792 | B2 | 7/2020 | Oh |
| 2002/0066279 | A1 | 6/2002 | Kiyomatsu |
| 2015/0119003 | A1 | 4/2015 | Park et al. |
| 2016/0139790 | A1 | 5/2016 | Shinomoto et al. |
| 2016/0147208 | A1 | 5/2016 | Shinomoto et al. |
| 2016/0381742 | A1 | 12/2016 | Banavara |
| 2017/0053516 | A1 | 2/2017 | Wu et al. |
| 2017/0186079 | A1 | 6/2017 | Kim et al. |
| 2017/0219279 | A1 | 8/2017 | Chae et al. |
| 2018/0266751 | A1* | 9/2018 | Lim ................ F25D 23/028 |

FOREIGN PATENT DOCUMENTS

| | | | |
|---|---|---|---|
| CN | 105630844 | | 6/2016 |
| CN | 106773859 | | 5/2017 |
| CN | 106920143 | | 7/2017 |
| CN | 106931700 A | * | 7/2017 ............. F25D 11/00 |
| EP | 1 742 513 | | 1/2007 |
| EP | 3 185 193 | | 6/2017 |
| JP | 2002-236798 | | 8/2002 |
| JP | 2002-243335 | | 8/2002 |
| JP | 2003-4367 | | 1/2003 |
| JP | WO2015-029334 | | 3/2017 |
| JP | 2017-533481 | | 11/2017 |
| KR | 20-0164614 Y1 | | 2/2000 |
| KR | 2001-0054983 | | 7/2001 |
| KR | 10-0677269 | | 1/2007 |
| KR | 10-2007-0078939 | | 8/2007 |
| KR | 10-2008-0037129 | | 4/2008 |
| KR | 10-2011-0007663 | | 1/2011 |
| KR | 10-2011-0097337 | | 8/2011 |
| KR | 10-2011-0097339 | | 8/2011 |
| KR | 10-2014-0133337 | | 11/2014 |
| KR | 10-2015-0048529 | | 5/2015 |
| KR | 10-2015-0124155 | | 11/2015 |
| KR | 10-2016-0000931 | | 1/2016 |
| KR | 10-1754372 | | 6/2017 |
| KR | 10-2017-0092364 | | 8/2017 |
| KR | 10-1830660 | | 2/2018 |
| TW | M549892 U | | 10/2017 |
| WO | 2017/135742 | | 8/2017 |

OTHER PUBLICATIONS

Office Action dated Feb. 27, 2023 in counterpart Korean Application No. 10-2018-0043575 and English-language translation.
Extended Search Report dated Jan. 28, 2021 in counterpart European Patent Application No. 18914821.6.
Search Report and Written Opinion dated Jan. 11, 2019 in counterpart International Patent Application No. PCT/KR2018/005179 and English-language translation.
Office Action dated May 19, 2023 in counterpart Chinese Application No. 201880092241.X and English-language translation.
Communication pursuant to Article 94(3) EPC dated Jul. 3, 2023 in counterpart European Application No. 18914821.6.
Notification of Grant dated Jan. 6, 2024 in counterpart Chinese Application No. 201880092241.X and English-language machine translation.

* cited by examiner

FIG. 2D
FIG. 2E
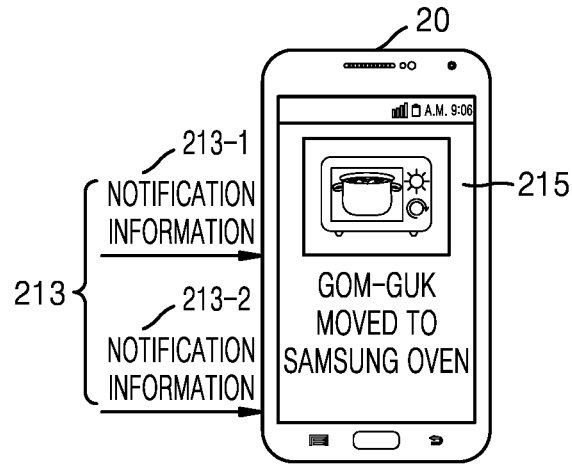
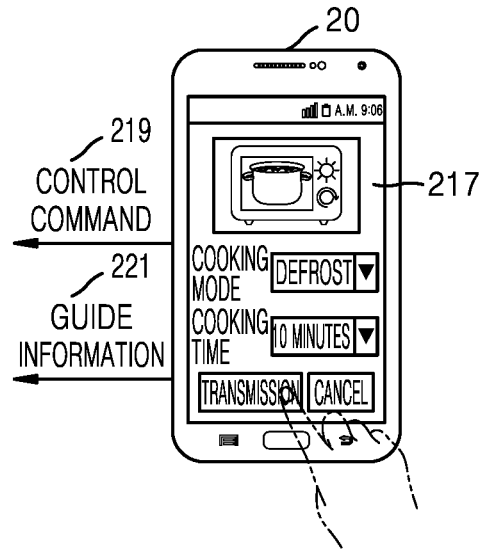
FIG. 2F
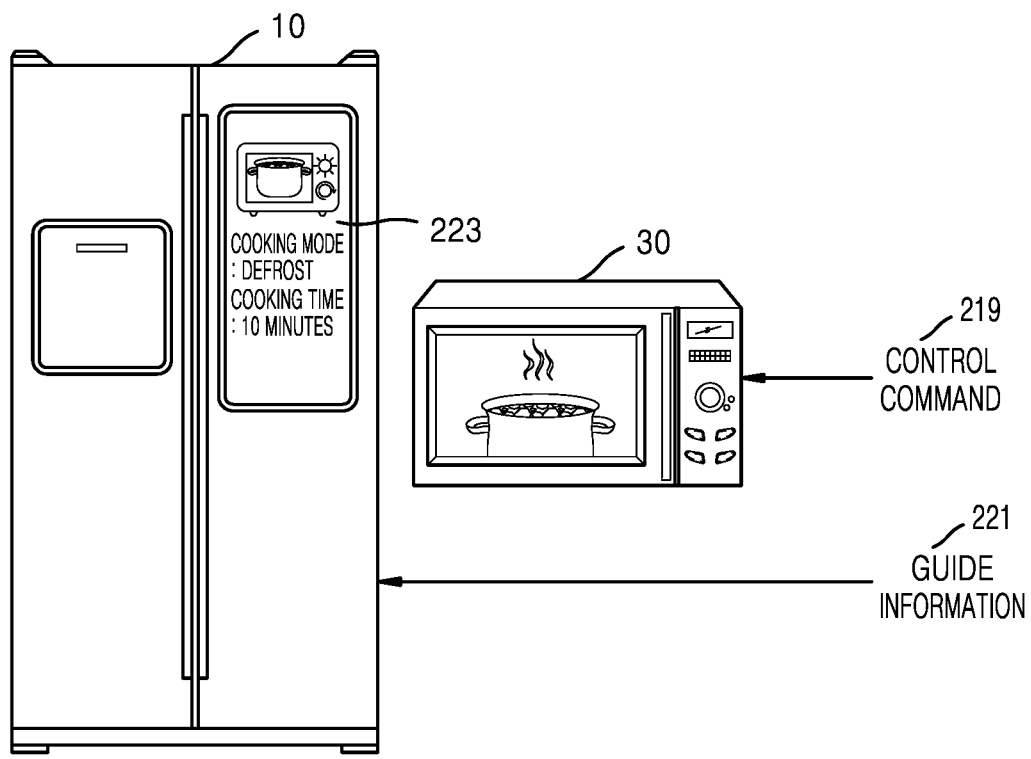

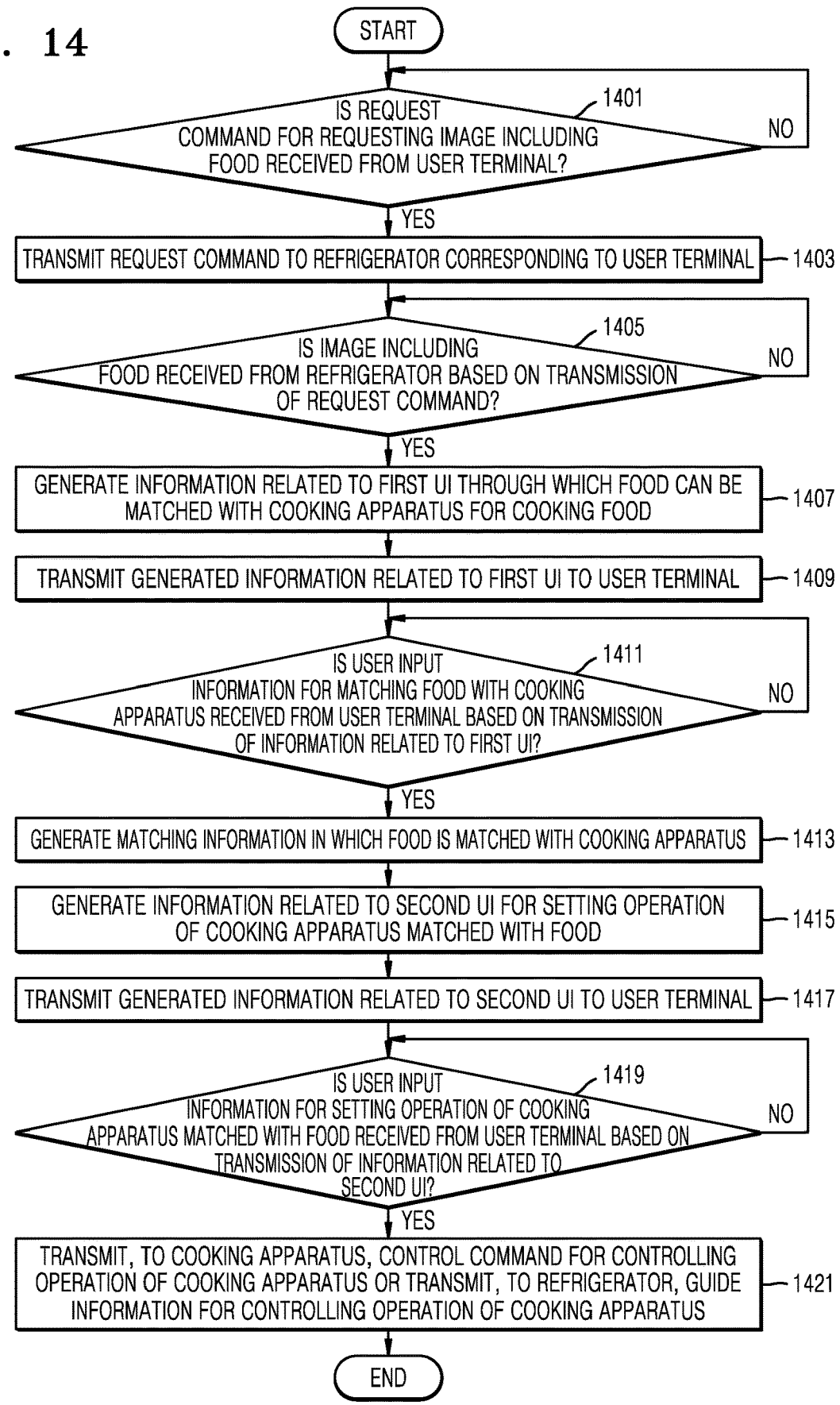

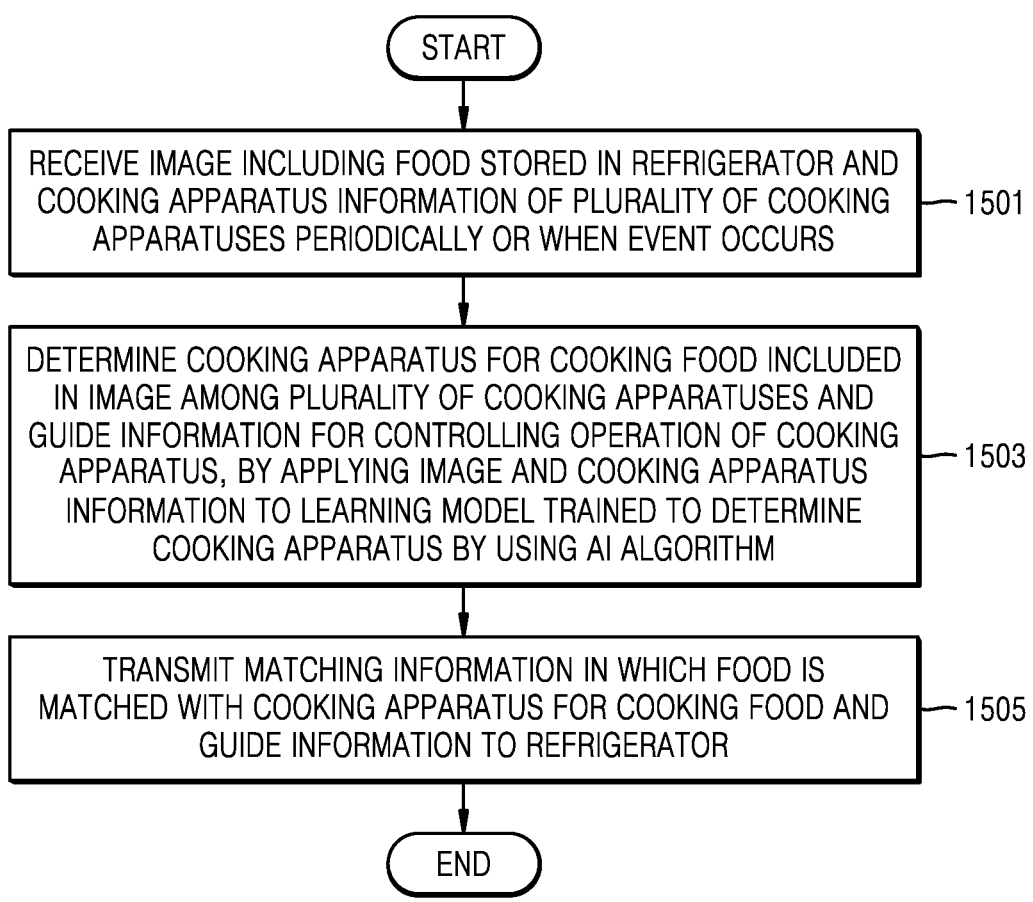

REFRIGERATOR AND METHOD FOR DISPLAYING USER INTERFACE ON REFRIGERATOR, USER TERMINAL, AND METHOD FOR PERFORMING FUNCTION IN USER TERMINAL

This application is the U.S. national phase of International Application No. PCT/KR2018/005179, filed May 4, 2018, which designated the U.S. and claims priority to 10-2018-0043575, filed Apr. 13, 2018, the entire contents of each of which are hereby incorporated by reference.

BACKGROUND

Field

The embodiments below relate to a refrigerator and a method for displaying a user interface of the refrigerator. In addition, the embodiments relate to a user terminal and a method for displaying a user interface of the user terminal.

Description of Related Art

Refrigerators are electronic devices (or home appliances) configured to store food in a cold or freezing state. Refrigerators may store not only food but also medicines, alcoholic beverages, cosmetics, or the like.

Due to technological developments, refrigerators may display an operating mode on a display thereof. In addition, refrigerators may display information or receive a user input by displaying a user interface on the display. Furthermore, a recent refrigerator may include a communication unit capable to connect to an external device (e.g., a server connected to the Internet).

As such, a refrigerator provides various services to a user via a display and a communication unit.

SUMMARY

Recently, as the number of married couples increases, it may be difficult for a person (e.g., husband or wife) who usually prepares a meal to sufficiently pay attention to a meal of a family member (e.g., wife, husband, or children) who is at home while he/she is outside.

The person outside may tell the family member who is at home how to cook the food by talking on the phone or sending a text message, however, this method has limitations in delivering sufficient information about cooking the food. In particular, when a cooking apparatus (e.g., an oven, a gas stove, a microwave, or the like) is needed to cook food, a situation may occur wherein family members not familiar with the use of cooking apparatuses may not understand how to operate the cooking apparatus via this method of delivering information only.

Accordingly, there is a need for an effective and active method of delivering, by a person who knows how to prepare food, a food cooking method to a third party located in a remote place.

In addition, technical problems to be solved by the present disclosure are not limited to the technical problems described above, and other non-described technical problems could be clearly understood to those of ordinary skill in the art to which the present disclosure belongs from the description below.

According to an embodiment of the present disclosure, there is provided a refrigerator including: a display; a storage chamber storing food therein; a temperature detection unit configured to detect the internal temperature of the storage chamber; a cooling unit configured to supply cold air to the storage chamber; a camera configured to photograph food in the storage chamber; a communication unit configured to communicate with a user terminal; at least one processor electrically connected to the temperature detection unit, the camera, the cooling unit, and the communication unit; and a memory electrically connected to the at least one processor, wherein the memory stores at least one instruction to be executed by the processor to control the camera to photograph the food stored in the storage chamber, control the communication unit to transmit the image including the photographed food to the user terminal, and control, upon receiving, based on the transmission of the image, matching information in which the food included in the image is matched with a cooking apparatus, the display to display a user interface for guiding movement of the food to the cooking apparatus based on the matching information.

According to another embodiment of the present disclosure, there is provided a refrigerator including: a display; a storage chamber storing food therein; a temperature detection unit configured to detect the internal temperature of the storage chamber; a cooling unit configured to supply cold air to the storage chamber; a camera configured to photograph food in the storage chamber; a communication unit configured to communicate with an external device; at least one processor electrically connected to the temperature detection unit, the camera, the cooling unit, and the communication unit; and a memory electrically connected to the at least one processor, wherein the memory stores at least one instruction to be executed by the processor to control the camera to photograph the food stored in the storage chamber, control the display to display a first user interface for matching the photographed food with a cooking apparatus, control the display to display a second user interface for setting an operation of the cooking apparatus matched with the food, and control the display to display, in response to the set operation, a third user interface for setting a time when the operation of the cooking apparatus matched with the food is to be controlled or guide information for controlling the operation of the cooking apparatus matched with the food is to be provided according to the set operation.

According to another embodiment of the present disclosure, there is provided a method of performing, by a user terminal, a function, the method including: performing, upon receiving an image including food, a control operation to display a first user interface for matching the food with a cooking apparatus for cooking the food; generating matching information in which the food is matched with the cooking apparatus, in response to a user input, on the first user interface, for matching the food with the cooking apparatus; performing a control operation to display a second user interface for setting an operation of the cooking apparatus matched with the food; and performing at least one of a function of controlling the operation of the cooking apparatus or a function of transmitting guide information for controlling the operation of the cooking apparatus, in response to a user input, on the second user interface, for setting the operation of the cooking apparatus.

According to another embodiment of the present disclosure, there is provided a user terminal including: a display; a communication unit configured to communicate with a refrigerator; at least one processor electrically connected to the refrigerator; and a memory electrically connected to the at least one processor, wherein the memory stores at least one instruction to be executed by the processor to control, upon receiving, through the communication unit, an image including food stored in the refrigerator, the display to display a first user interface for matching the food with a cooking apparatus for cooking the food, generate matching information in which the food is matched with the cooking apparatus, in response to a user input, on the first user interface, for matching the food with the cooking apparatus, control the display to display a second user interface for setting an operation of the matched cooking apparatus, and perform at least one of a function of controlling the operation of the cooking apparatus or a function of transmitting guide information for controlling the operation of the cooking apparatus, in response to a user input, on the second user interface, for matching the food with the cooking apparatus.

According to another embodiment of the present disclosure, there is provided a server including: a data transmission unit configured to transmit, upon receiving, from a user terminal, a request command requesting an image including food, the request command to a refrigerator corresponding to the user terminal; a data reception unit configured to receive the image including the food from the refrigerator based on the transmission of the request command; and a data processing unit configured to generate information related to a first user interface for matching the food with a cooking apparatus for cooking the food; wherein the data transmission unit is further configured to transmit the generated information related to the first user interface to the user terminal; the data processing unit is further configured to generate matching information in which the food is matched with the cooking apparatus, in response to a user input for matching the food with the cooking apparatus based on the information related to the first user interface; the data processing unit is further configured to generate information related to a second user interface for setting an operation of the cooking apparatus matched with the food; the data transmission unit is further configured to transmit the generated information related to the second user interface to the user terminal; and the data transmission unit is further configured to transmit, to the cooking apparatus, a control command for controlling the operation of the cooking apparatus or transmit, to the refrigerator, guide information for controlling the operation of the cooking apparatus, in response to a user input for setting the operation of the cooking apparatus matched with the food based on the information related to the second user interface.

According to another embodiment of the present disclosure, there is provided a server including: a recognition data input unit configured to receive, periodically or at an event occurring time, an image including food stored in a refrigerator and cooking apparatus information of a plurality of cooking apparatuses; a learning model application unit configured to determine a cooking apparatus for cooking the food included in the image among the plurality of cooking apparatuses and guide information for cooking the food by applying the food image and cooking apparatus information to a learning model trained to determine a cooking apparatus by using an artificial intelligence algorithm; and a recognition result provision unit configured to transmit matching information, in which the food is matched with the cooking apparatus for cooking the food, and the guide information to the refrigerator.

According to the present disclosure, a user interface for guiding movement of food to a cooking apparatus for cooking the food may be displayed on a display of a refrigerator, thereby giving a help a user of the refrigerator to determine a cooking apparatus suitable for cooking the food.

In addition, a user interface for guiding to control an operation of a cooking apparatus for cooking food may be displayed on a display of a refrigerator, thereby enabling a user, who is not skilled to control an operation of the cooking apparatus, to easily cook the food according to the guide provided by the refrigerator.

In addition, a user who is not skilled to control an operation of the cooking apparatus may preemptively set the operation of the cooking apparatus and a time at which the operation is to be provided, thereby enabling the user, user who is not skilled to control the operation of the cooking apparatus, to receive a cooking guide at a food taking time.

In addition, a user of a user terminal may provide, to a user (e.g., a family member at home) who is to take food at a remote place, guide information for controlling a cooking apparatus or controlling an operation of the cooking apparatus, thereby significantly improving convenience and a sense of psychological stability of the user who provides a food cooking method.

BRIEF DESCRIPTION OF THE DRAWINGS

FIGS. 2A, 2B, 2C, 2D, 2E, 2F, 3A, 3B, 3C, 3D, 3E, 4A, 4B, 4C, 4D, 5A, and 5B illustrate operations of a system including a user terminal and a refrigerator, according to various embodiments of the present disclosure.

FIGS. 14 and 15 are flowcharts with respect to a server according to various embodiments of the present disclosure.

DETAILED DESCRIPTION

Figure 1A:
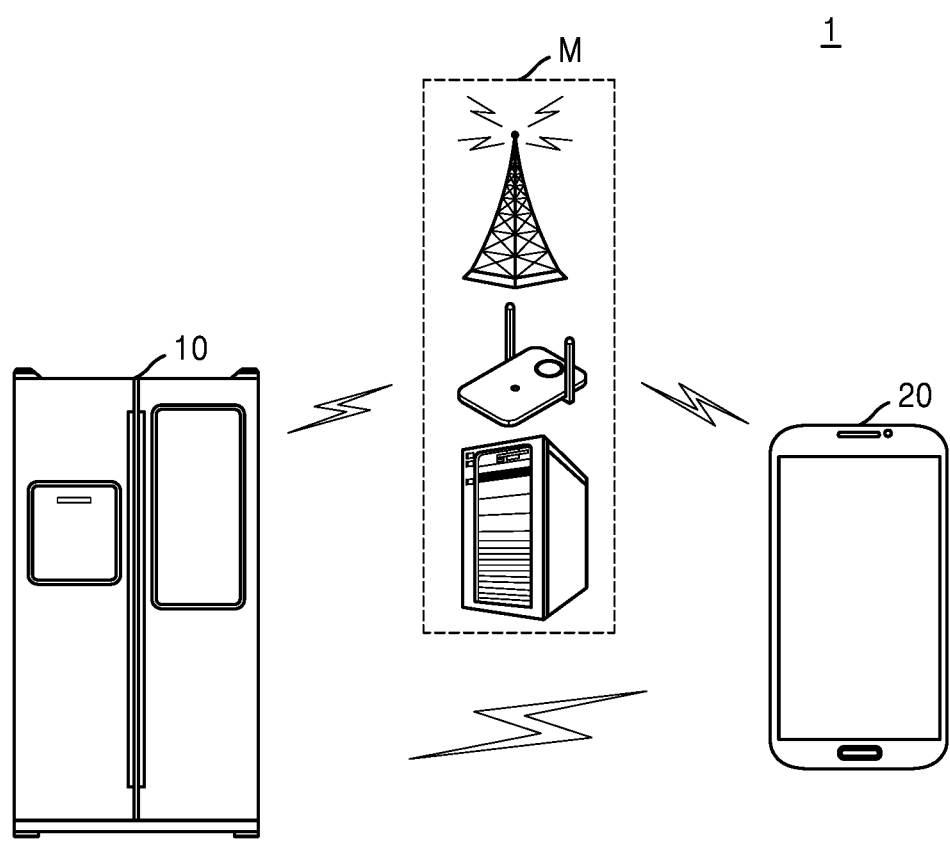
FIGS. 1A, 1B, and 1C illustrate systems including a refrigerator, according to various embodiments of the present disclosure.

Hereinafter, example embodiments of the present disclosure will be described in detail with reference to the accompanying drawings. In addition, a method of manufacturing and using an image capturing apparatus, according to an embodiment of the present disclosure, will be described in detail with reference to the accompanying drawings. Like reference numerals or signs in the drawings denote like parts or elements for performing substantially the same functions.

An application according to an embodiment of the present disclosure indicates software executed on a computer operating system (OS) or a mobile OS and used by a user. For example, the application may include a web browser, a camera application, a mobile payment application (or an electronic payment application or a payment application), a photo album application, a word processor, a spread sheet, a contacts application, a calendar application, a memo application, an alarm application, a social network system (SNS) application, a call application, a game store, a game application, a chat application, a map application, a music player, a video player, or the like.

The application according to an embodiment of the present disclosure may indicate software executed by a refrigerator or an external device (e.g., a wearable device, a server, or the like) connected to the refrigerator in a wired or wireless manner. In addition, the application according to an embodiment of the present disclosure may indicate software executed by a refrigerator in response to a received user input.

In an embodiment of the present disclosure, 'user input' may be used as a term including, for example, a user's button (or key) selection, the user's button (or key) push (or click), the user's soft button (or soft key) touch, a touch (or including non-contact such as hovering) received (or detected) on a touch screen by the user, a touch gesture (or including non-contact such as hovering) received (or detected) on the touch screen by the user, the user's voice, the user's presence (e.g., the user appears within a camera recognition range), or the user's motion. In addition, 'button (or key) selection' may be used as a term indicating a push (or click) of a button (or key) or a touch of a soft button (or soft key).

In an embodiment of the present disclosure, 'food' may include food ingredients, cooked food, food contained in a dish, instant food, frozen food, or the like.

In an embodiment of the present disclosure, 'user interface (UI)' is a medium for an interaction between a user and an electronic device (e.g., a refrigerator, a user terminal, or a cooking apparatus) of the present disclosure and may be an interface configured to receive a user input and/or provide information to the user. The UI may include, for example, a text UI, a graphical user interface (GUI), or an audio UI.

Figure 1B:
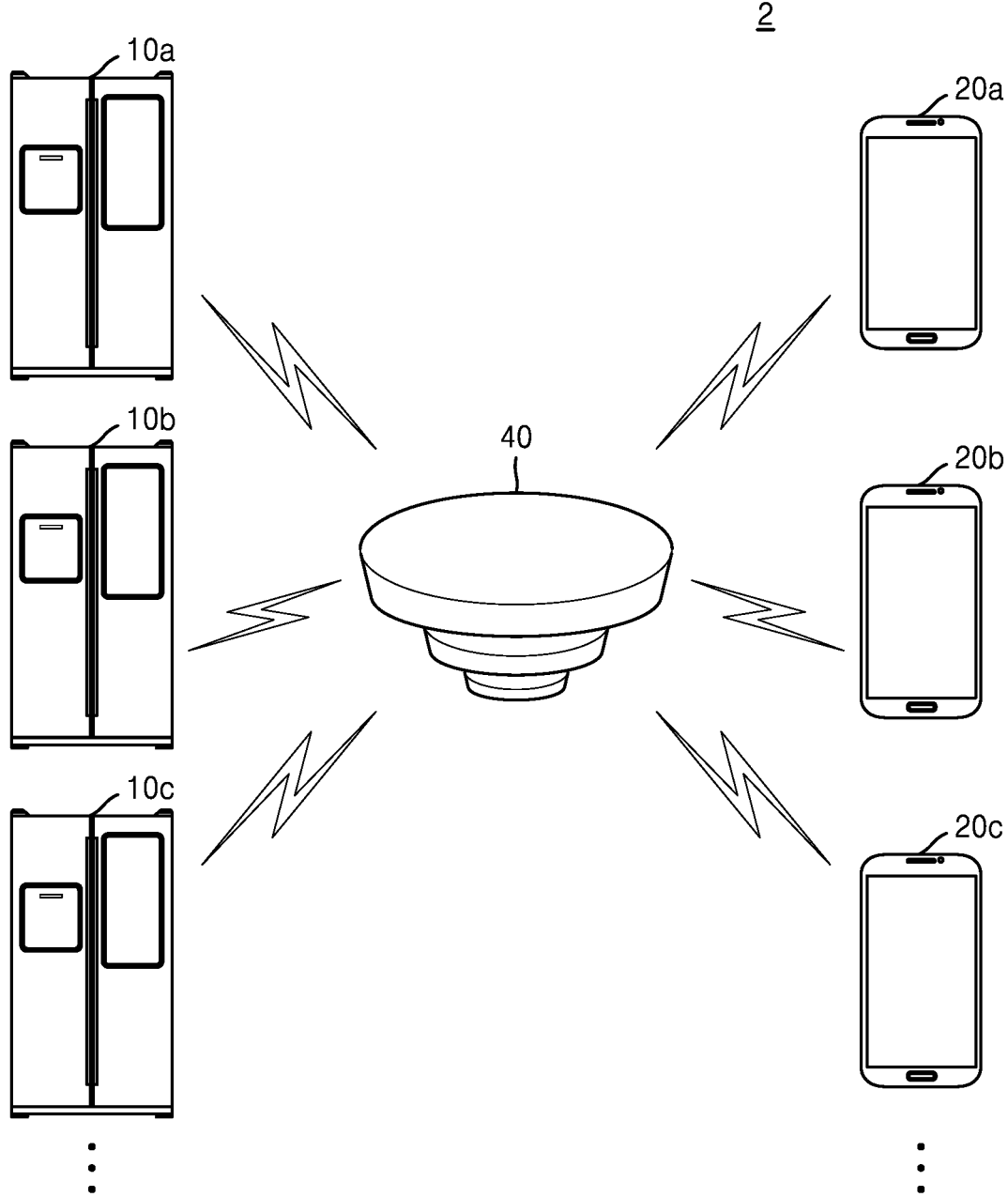
Figure 1C:
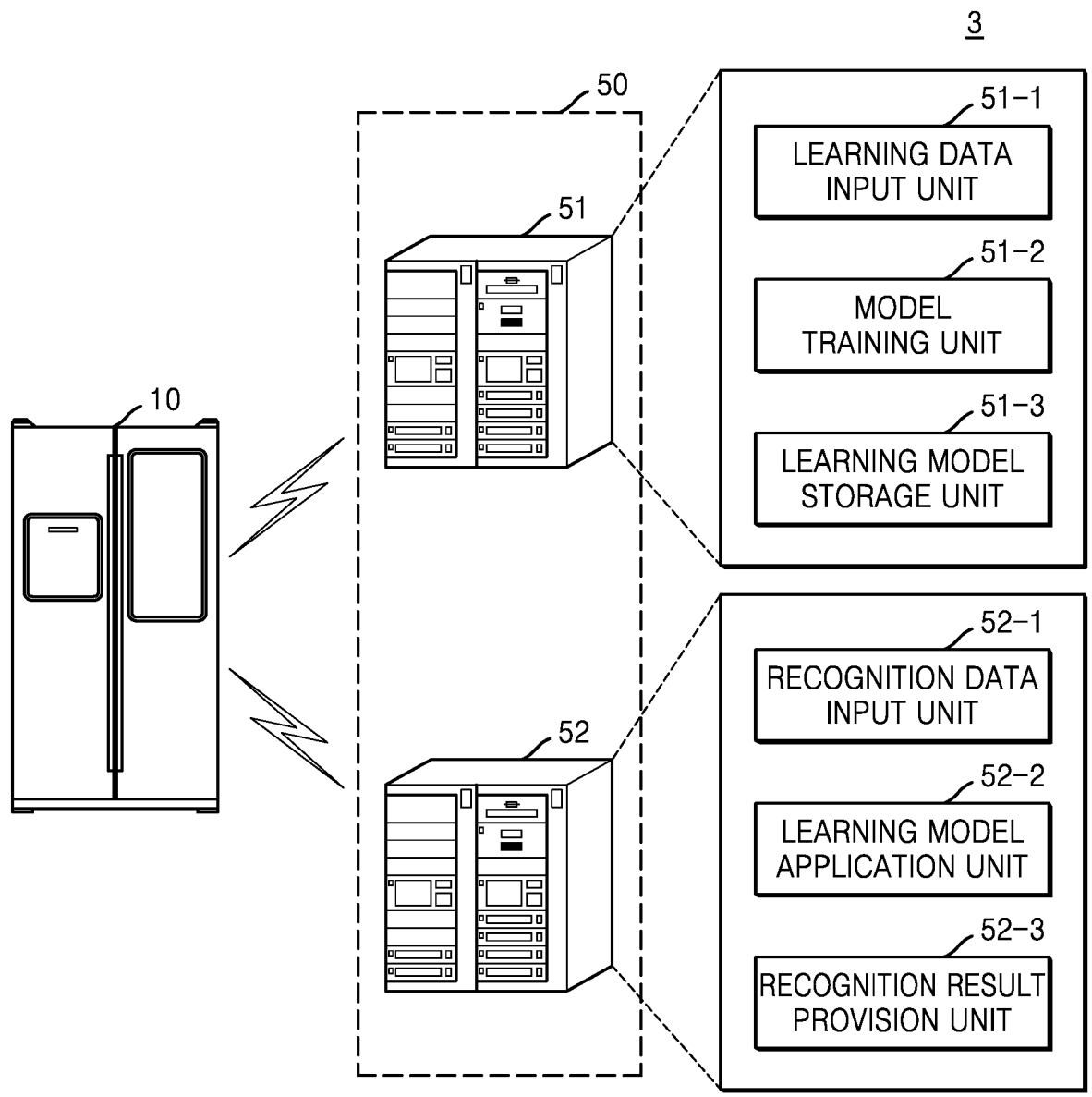

FIGS. 1A to 1C illustrate systems including a refrigerator, according to various embodiments of the present disclosure.

In FIG. 1A, a system 1 may include a refrigerator 10 and a user terminal 20. In the system 1, the refrigerator 10 may communicate with the user terminal 20. The refrigerator 10 may communicate with the user terminal 20 through a short-range network or a long-range network. Herein, the communication may include communication through a direct connection based on a short-range communication technique or through a third relay M. The third relay may include at least one of, for example, a base station, a hub access point, a gateway, a switch, and/or a relay server.

According to various embodiments of, in FIG. 1A, the user terminal 20 may be in a state in which an application for performing various embodiments of the present disclosure is previously installed. Alternatively, in FIG. 1A, a user of the user terminal 20 may download the application for performing various embodiments of the present disclosure from an application server (e.g., a Google Store, an App Store, or the like) and install the downloaded application in the user terminal 20.

In this situation, when an image including food is received, a processor of the user terminal 20 may control a display of the user terminal 20 to display a first UI for matching the food with a cooking apparatus for cooking the food. In response to a user input, on the first UI, for matching the food with the cooking apparatus, the processor of the user terminal 20 may generate matching information in which the food is matched with the cooking apparatus.

In addition, the processor of the user terminal 20 may control the display of the user terminal 20 to display a second UI for controlling an operation of the matched cooking apparatus. In response to a user input, on the second UI, for setting the operation of the matched cooking apparatus, the processor of the user terminal 20 may perform at least one of a function of controlling the operation of the cooking apparatus and a function of transmitting guide information for controlling the operation of the cooking apparatus. For example, the processor of the user terminal 20 may control a communication unit of the user terminal 20 to transmit, to the communication-connected refrigerator 10, the guide information for controlling the operation of the cooking apparatus. The processor of the refrigerator 10 which has received the guide information may control the display of the refrigerator 10 to display a UI for guiding to control the operation of the cooking apparatus.

In FIG. 1B, a system 2 may include a plurality of refrigerators 10a, 10b, and 10c, a plurality of user terminals 20a, 20b, and 20c, and a platform server 40.

In FIG. 1B, at least one of the plurality of refrigerators 10a, 10b, and 10c, the plurality of user terminals 20a, 20b, and 20c, and the platform server 40 may communicate with each other through a short-range network or a long-range network. Herein, the communication may include communication through a direct connection based on a short-range communication technique or through a third relay (e.g., the relay M of FIG. 1A).

In FIG. 1B, a manufacturer, a seller, or an operator of each of the plurality of refrigerators 10a, 10b, and 10c may provide, to the platform server 40, an application for performing various embodiments of the present disclosure. A manufacturer, a seller, or an operator of the platform server 40 may install the received application in the platform server 40. In this case, the seller or the operator of the platform server 40 maybe the same as a seller, or an operator of at least one of the plurality of refrigerators 10a, 10b, and 10c. The platform server 40 may include a cloud server or one or more servers (or devices).

In this situation, at least one user terminal 20a among the plurality of user terminals 20a, 20b, and 20c may transmit, to the platform server 40, a request command for requesting a food image including food.

A data reception unit of the platform server 40 may receive the request command. A data processing unit of the platform server 40 may search for the refrigerator 10a corresponding to the user terminal 20a which has transmitted the request command. For example, the data processing unit may search for the refrigerator 10a having the same group identifier as a group identifier of the user terminal 20a. A data transmission unit of the platform server 40 may transmit, to the retrieved refrigerator 10a among the plurality of refrigerators 10a, 10b, and 10c, the request command for requesting a food image. The data reception unit of the platform server 40 may receive an image including food stored in the retrieved refrigerator 10a and cooking apparatus information of a plurality of cooking apparatuses around the retrieved refrigerator 10a, based on the transmission of the request command. The data processing unit of the platform server 40 may generate information related to a first UI for matching the received image with a cooking apparatus for cooking the food included in the image. The data transmission unit of the platform server 40 may transmit the information related to the first UI to the user terminal 20a which has transmitted the request command for requesting a food image.

The user terminal 20a may render the information related to the first UI and display, on a display, the first UI for matching food with a cooking apparatus. In response to a user input, on the first UI displayed on the user terminal 20a, for matching food with a cooking apparatus, the data processing unit of the platform server 40 may generate matching information in which the food is matched with the cooking apparatus.

The data processing unit of the platform server 40 may generate information related to a second UI for setting an operation of the matched cooking apparatus. The data transmission unit of the platform server 40 may transmit the generated information related to the second UI to the user terminal 20a. According to various embodiments, upon receiving notification information that food has moved from the refrigerator 10a or the cooking apparatus based on the information related to the first UI, the data processing unit of the platform server 40 may generate the information related to the second UI for setting an operation of the cooking apparatus.

The user terminal 20a may render the information related to the second UI and display, on the display, the second UI for setting the operation of the cooking apparatus. In response to a user input, on the second UI displayed on the user terminal 20a, for setting operation of the cooking apparatus, the data transmission unit of the platform server 40 may transmit, to the cooking apparatus, a control command for controlling the operation of the cooking apparatus. Alternatively, the data transmission unit may transmit, to the refrigerator 10a, guide information for controlling the operation of the cooking apparatus. A processor of the refrigerator 10a which has received the guide information may control a display of the refrigerator 10a to display a UI for guiding to control the operation of the cooking apparatus.

In FIG. 1C, a system 3 may include the refrigerator 10 and an artificial intelligence (AI) server 50. The AI server 50 may be, for example, a server including a learning model trained using an AI algorithm. At least one of the refrigerator 10 and the AI server 50 may communicate with each other through a short-range network or a long-range network. Herein, the communication may include communication through a direct connection based on a short-range communication technique or through a third relay (e.g., the relay M of FIG. 1A). The AI server includes, for example, an AI system for implementing human-level intelligence. Unlike conventional rule-based smart systems, the AI system gets smarter while a machine self-learns and self-determines. The more the AI system is used, the more the AI system's recognition rate improves and the more it can accurately understand user preferences AI technology includes machine learning (e.g., deep learning) and element technologies using the machine learning. Machine learning is an algorithm technology of self-classifying/self-learning features of input data. Element technologies are technologies of utilizing a machine learning algorithm and may include technical fields such as linguistic understanding, visual understanding, inference/prediction, knowledge representation, and motion control.

The AI server 50 may include at least one of a data learning server 51 and a data determination server 52. The data learning server 51 and the data determination server 52 may be implemented by one or more servers. When the data learning server 51 is physically separated from the data determination server 52, the data learning server 51 may communicate with the data determination server 52 through a short-range network or a long-range network.

A learning data input unit 51-1 of the data learning server 51 may acquire data required for context determination. For example, the learning data input unit 51-1 may acquire, as learning data, an image including food, information about a cooking apparatus for cooking the food, and guide information of the cooking apparatus for cooking the food. The guide information of the cooking apparatus may include, for example, cooking information provided by a manufacturer of the food, cooking information of the food, which is provided by a chef, and cooking information of the food, which is provided by other users who have cooked the food.

A model training unit 51-2 of the data learning server 51 may train a data recognition model to be used for the context determination, by using the learning data and the AI algorithm. In this case, the data recognition model may be previously constructed. For example, the data recognition model may be previously constructed by receiving basic learning data. As another example, the data recognition model may be a text analysis model previously constructed by using big data.

The data recognition model may be constructed by considering an application field of the recognition model, a purpose of learning, a computer performance of a device, or the like. The data recognition model may be based on, for example, a neural network. The data recognition model may be designed to simulate a human brain structure on a computer system. The data recognition model may include a plurality of network nodes which simulate neurons of a human neural network and have weights. Each of the plurality of network nodes may form a connection relationship to simulate a synaptic activity of a neuron which gives and takes a signal through a synapse. The data recognition model may include, for example, a neural network model or a deep learning model developed from the neural network model. In the deep learning model, the plurality of network nodes may be located at different depths (or layers) and give and take data according to a convolutional connection relationship. For example, a model such as a deep neural network (DNN) model, a recurrent neural network (RNN) model, or a bidirectional recurrent deep neural network (BRDNN) model may be used as the data recognition model, but the data recognition model is not limited thereto. The model training unit 51-2 may generate, as a learning result, a learning model trained to determine a cooking apparatus.

In addition, when the data recognition model is trained, a learning model storage unit 51-3 of the data learning server 51 may store the trained data recognition model. The learning model storage unit 51-3 may store the trained data recognition model in a memory of the AI server 50. Alternatively, the learning model storage unit 51-3 may store the trained data recognition model in a memory of a server (not shown) connected to the AI server 50 through a short-range or long-range network.

A recognition data input unit 52-1 of the data determination server 52 may acquire recognition data required for context determination. The recognition data may include, for example, a food image including food stored in the refrigerator 10 and cooking apparatus information of a plurality of cooking apparatuses. The cooking apparatus information of the plurality of cooking apparatuses may include, for example, cooking information for the plurality of cooking apparatuses present at home where the refrigerator 10 is located. The recognition data input unit 52-1 may receive, periodically or at an event occurring time, a food image and cooking apparatus information of a plurality of cooking apparatuses. Herein, at least one of the food image and the cooking apparatus information of the plurality of cooking apparatuses may be previously received and stored in a memory. A periodically receiving time may be, for example, before a breakfast time (between 5 o'clock and 7 o'clock), at a lunch time (between 11 o'clock and 13 o'clock), or before a dinner time (between 17 o'clock and 19 o'clock). In addition, the event occurring time may be a situation when an event signal according to opening of a door of the refrigerator 10, an event signal according to recognition of a user on the front of the refrigerator 10, or an event signal according to a user set time is generated.

A learning model application unit 52-2 of the data determination server 52 may determine at least one of a cooking apparatus capable of cooking food among the plurality of cooking apparatuses and guide information for cooking the food, by using the learning model trained by the data learning server 51 to determine a cooking apparatus. For example, the learning model application unit 52-2 may determine a cooking apparatus for cooking food among the plurality of cooking apparatuses and guide information for cooking the food, by applying the food image and the cooking apparatus information from the recognition data input unit 52-1 to the learning model.

A recognition result provision unit 52-3 of the data determination server 52 may transmit, to the refrigerator 10, matching information determined by the food and the learning model and the guide information for cooking the food.

A processor 3110, a communication unit 3120, a display 3170, and a memory 3190 of the refrigerator 10 to be described below may correspond to the processor 3110, the communication unit 3120, the display 3170, and the memory 3190 of the refrigerator 10 of FIG. 17 to be described below, respectively.

In addition, a processor 4120, a display 4160, a communication unit 4190, and a memory 4130 of the user terminal 20 may correspond to the processor 4120, the display 4160, the communication unit 4190, and the memory 3190 4130 of the user terminal 20 of FIG. 18 to be described below, respectively.

Figures 1, 6A:
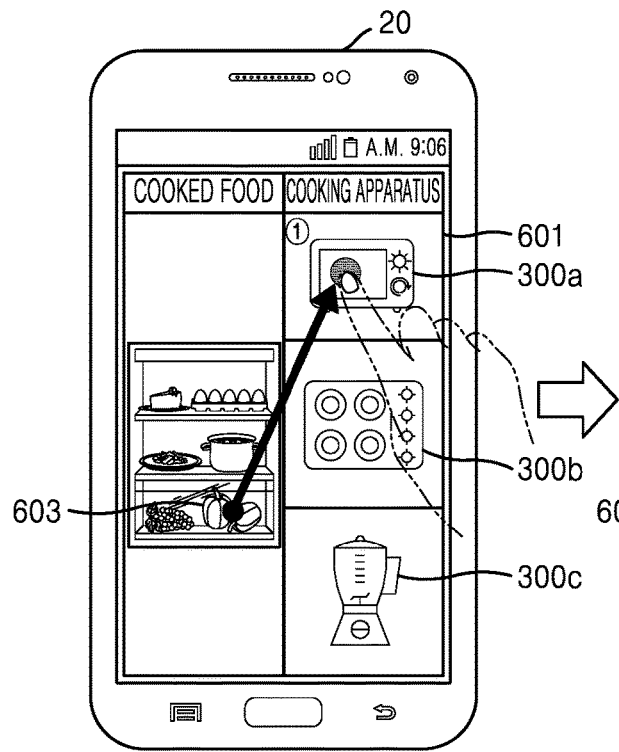
FIGS. 6A-1, 6A-2, 6A-3, 6A-4, 6B-1, 6B-2, 6B-3, and 6B-4 illustrate user interfaces (UIs) of a user terminal, according to various embodiments of the present disclosure.
Figures 2, 6A:
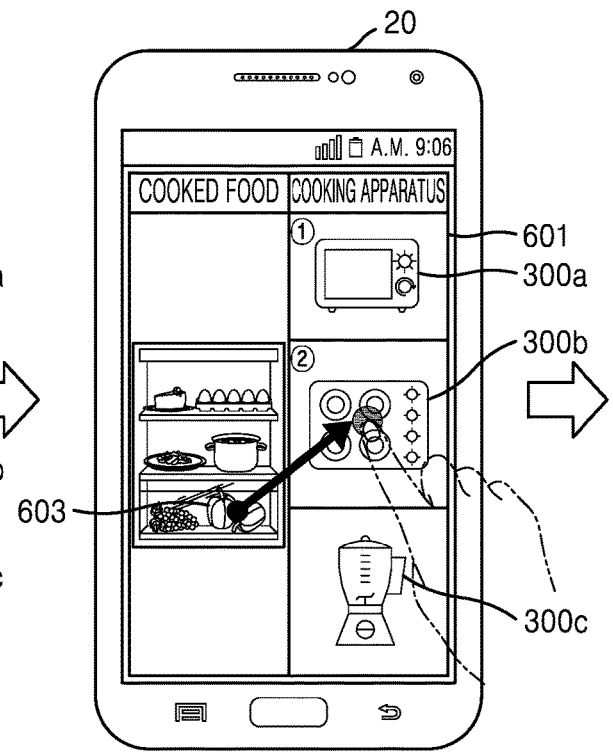
Figures 4, 6A:
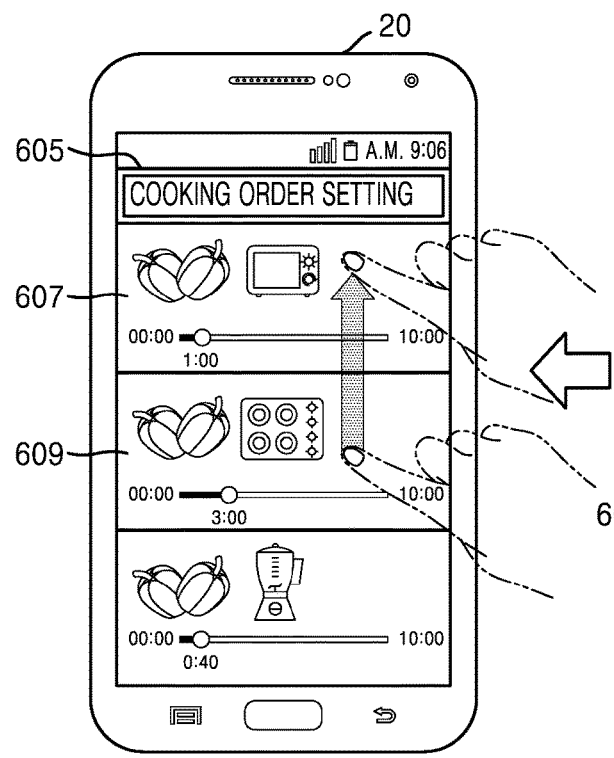
Figures 3, 6A:
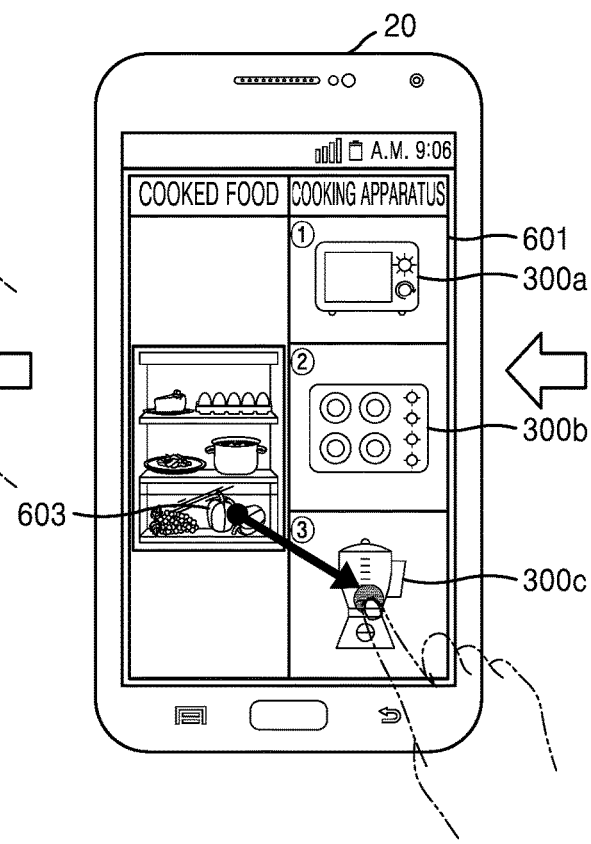

Systems of FIGS. 2 and 3 may correspond to at least one of the systems of FIGS. 1A to 1C described above.

In the system of FIG. 2, at least one of the refrigerator 10, the user terminal 20, and a cooking apparatus 30 may communicate with each other through a short-range or long-range network. Herein, the communication may include communication through a direct connection based on a short-range communication technique or through a third relay.

FIG. 2 illustrates an operation of a system including a user terminal and a refrigerator, according to various embodiments of the present disclosure.

Figure 2A:
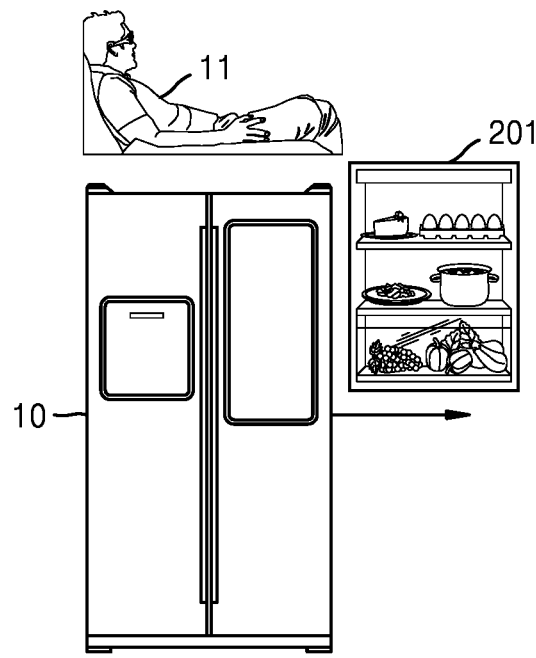
Figure 2B:
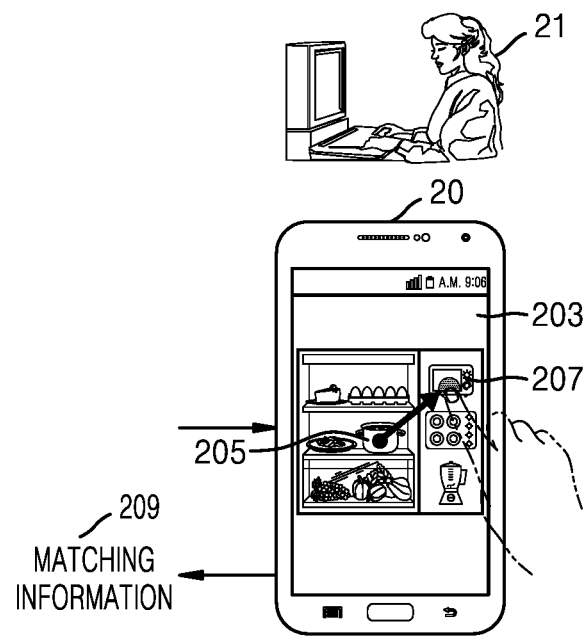
Figure 2C:
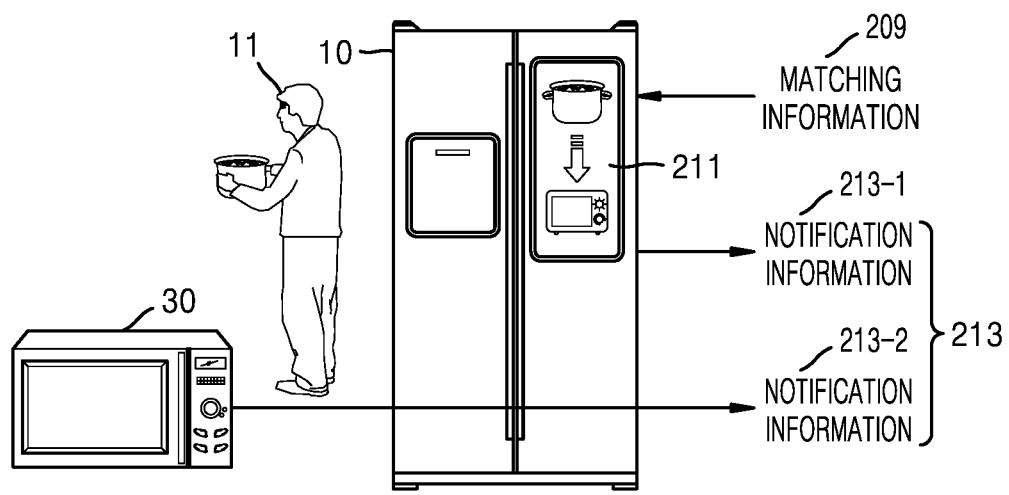

For example, operations of FIGS. 2A, 2C, and 2F illustrate an environment in which a user 11 at home uses the refrigerator 10, and operations of FIGS. 2B, 2D, and 2E illustrate an environment in which a user 21 at the outside uses the user terminal 20. For example, operations of FIGS. 2A, 2C, and 2F illustrate a situation in which a husband (or a wife or children), as the user 11, who is not skilled to cook food uses the refrigerator 10 at home, and operations of FIGS. 2B, 2D, and 2E illustrate a situation in which a wife (or a husband), as the user 21, who is skilled to cook food uses the user terminal 20 at the outside.

In operation of FIG. 2A, the processor 3110 of the refrigerator 10 may control a camera 3150 of the refrigerator 10 (e.g., an internal camera of the refrigerator 10) to photograph food stored in a storage chamber of the refrigerator 10. The processor 3110 may control the communication unit 3120 to transmit, to the user terminal 20, a food image 201 including photographed at least one food.

In operation of FIG. 2B, upon receiving the food image 201, the processor 4120 of the user terminal 20 may control the display 4160 to display a UI 203 for matching food included in the food image 201 with the cooking apparatus 30. In operation of FIG. 2B, when a user input for matching the food with the cooking apparatus 30 is detected through the UI 203, the processor 4120 may generate matching information in which the food is matched with at least one cooking apparatus. For example, in operation of FIG. 2B, when a user input for dragging a food object 205 included in the food image 201 to a cooking apparatus object 207 is detected, the processor 4120 may generate matching information 209 in which the food is matched with a cooking apparatus. Alternatively, when a user input for dragging at least one cooking apparatus object 207 to the food object 205 included in the food image is detected, the processor 4120 may generate the matching information 209 in which the food is matched with the cooking apparatus 30. In detail, the processor 4120 may generate the matching information 209 in which the food is matched with a microwave 30, in response to a user input for matching soup in a pot or frozen food with the microwave 30. When the matching information 209 is generated, the processor 4120 may control the communication unit 4190 to transmit the generated matching information 209 to the refrigerator 10.

In operation of FIG. 2C, when the matching information 209 is received, the processor 3110 of the refrigerator 10 may control the display 4160 to display a UI 211 for guiding the user 11 to move the food stored in the refrigerator 10 to the cooking apparatus 30, based on the received matching information 209.

In operation of FIG. 2C, the user 11 of the refrigerator 10 may move the food stored in the refrigerator 10 to the cooking apparatus 30, based on the guide through the UI 211. For example, when the food is frozen food, the user 11 of the refrigerator 10 may move the food to a cooking apparatus (e.g., a microwave, an oven, or the like) to thaw the food. When the food is moved for cooking, the user terminal 20 may receive notification information 213 that the food has been moved for cooking.

For example, when the food is withdrawn from the refrigerator 10, the processor 3110 of the refrigerator 10 may control the communication unit 3120 to transmit notification information 213-1 to the user terminal 20. As another example, when the food is inserted into or mounted on the cooking apparatus 30, the cooking apparatus 30 may transmit notification information 213-2 to the user terminal 20. As another example, when the refrigerator 10 includes an external camera, the processor 3110 of the refrigerator 10 may recognize an image captured by the external camera and identify whether the food is moved to the cooking apparatus. When it is identified that the food has been moved to the cooking apparatus, the processor 3110 may control the communication unit 3120 to transmit the notification information 213-1 to the user terminal 20. As another example, the external camera or a surrounding camera (not shown) of the refrigerator 10 may transmit a captured image to an image analysis server (not shown). When it is analyzed as an analysis result in the image analysis server that the food has been moved to the cooking apparatus, the image analysis server may transmit notification information to the user terminal 20 directly or via the refrigerator 10.

When the notification information 213 is received, the processor 4120 of the user terminal 20 may perform at least one of a function of controlling an operation of the cooking apparatus 30 or a function of transmitting guide information for controlling the operation of the cooking apparatus 30.

For example, as in operation of FIG. 2D, the processor 4120 of the user terminal 20 may control the display 4160 to display a UI 215 including a notification message that the food has been moved.

Thereafter, as in operation of FIG. 2E, the processor 4120 of the user terminal 20 may control the display 4160 to display a UI 217 for setting an operation of the cooking apparatus 30. The UI 217 may include at least one of, for example, a cooking mode, a cooking time, a cooking control, cooking start, and cooking cancellation. When a user input for setting an operation of the cooking apparatus through the UI 217 is detected, the processor 4120 of the user terminal 20 may control the communication unit 4190 to transmit, to an external device, a control command 219 for the cooking apparatus 30 or guide information 221 for controlling the operation of the cooking apparatus 30. For example, the processor 4120 may control the communication unit 4190 to transmit the control command 219 to the cooking apparatus 30. Alternatively, the processor 4120 may control the communication unit 4190 to transmit, to the refrigerator 10, the guide information 221 for controlling the operation of the cooking apparatus.

According to various embodiments, operation of FIG. 2E may be performed by omitting operation of FIG. 2D. That is, when the notification information 213 is received, the user terminal 20 may control the cooking apparatus 30 or control the display 4160 to display the UI 217 for setting an operation of the cooking apparatus.

In operation of FIG. 2F, when the control command 219 is received, the cooking apparatus 30 may start cooking the food in response to the control command. Alternatively, when the guide information 221 is received, the processor 3110 may control the display 3170 to display a UI 223 for guiding the operation of the cooking apparatus.

According to the present disclosure, the user 21 of the user terminal 20 at a remote place may guide the user 11 of the refrigerator 10 to properly cook food. In addition, every time the user 11 of the refrigerator 10 performs an action for cooking food, the user 21 of the user terminal 20 may check and guide a procedure of performing the action.

FIG. 3 illustrates an operation of a system including a user terminal and a refrigerator, according to various embodiments of the present disclosure.

Figure 3A:
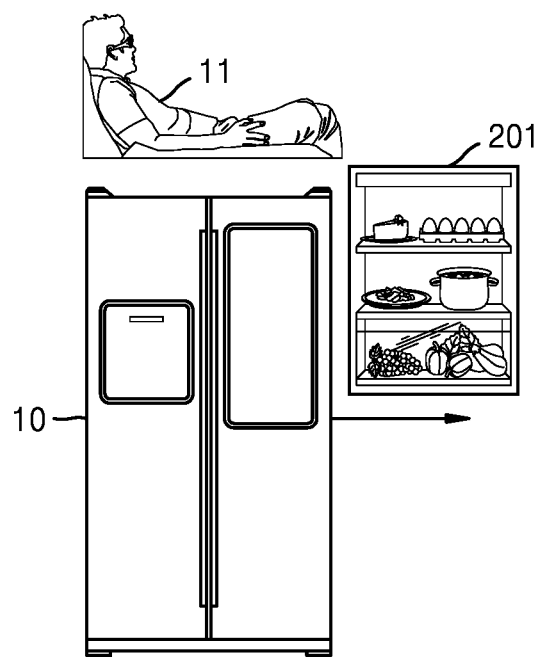

Operation of FIG. 3A corresponds to aforementioned operation of FIG. 2A, and thus, a description made above is not repeated. For example, operations of FIGS. 3A, 3D, and 3E illustrate an environment in which the user 11 at home uses the refrigerator 10, and operations of FIGS. 3B and 3C illustrate an environment in which the user 21 at the outside uses the user terminal 20.

Figure 3B:
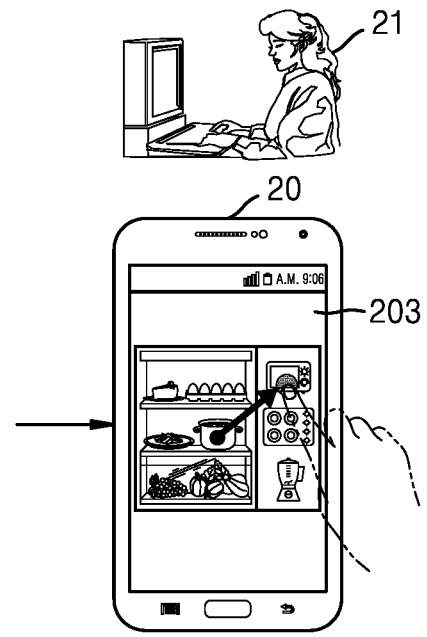

In operation of FIG. 3B, when the food image 201 is received from the refrigerator 10, the processor 4120 of the user terminal 20 may control the display 4160 to display the UI 203 for matching food included in the food image 201 with the cooking apparatus 30. The user 21 may perform a user input for matching the food with the cooking apparatus 30 through the UI 203. Alternatively, after performing the user input for the matching, the user 21 may further perform a user input for finishing the matching input.

Figure 3C:
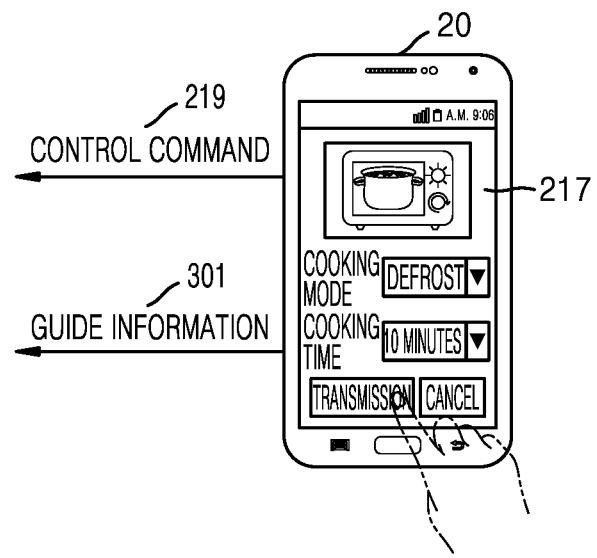
Figure 3D:
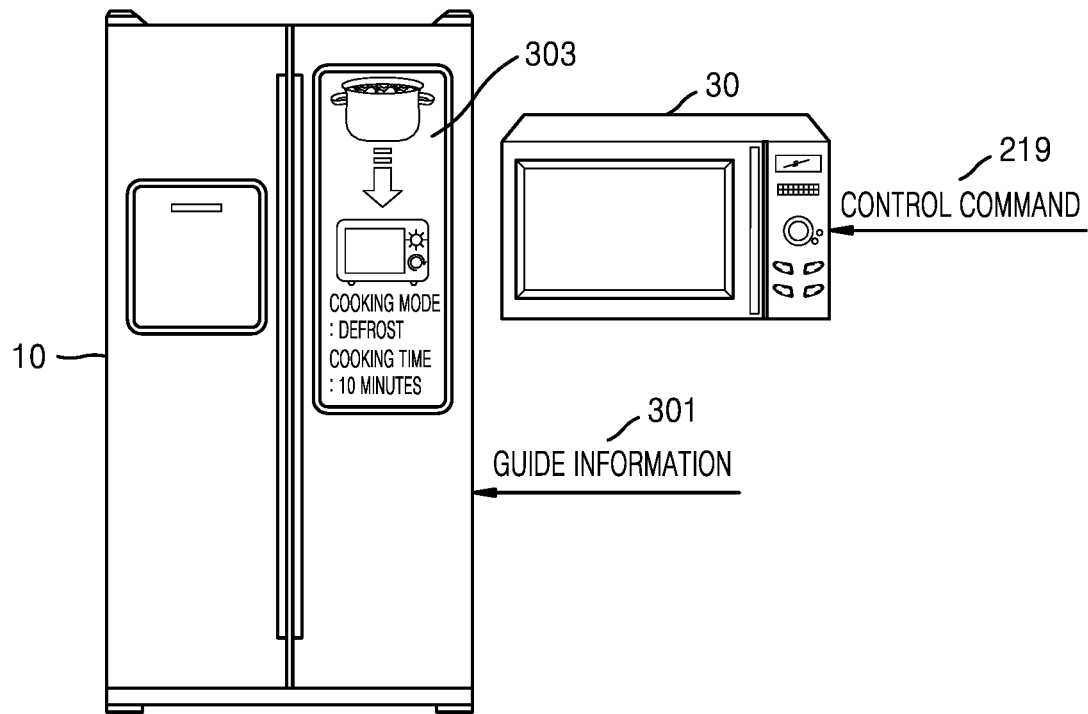
Figure 3E:
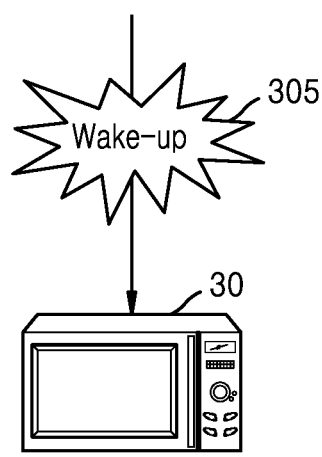

When the user input is detected, as in operation of FIG. 3C, the processor 4120 of the user terminal 20 may control the display 4160 to display the UI 217 for setting an operation of cooking apparatus 30. The user 21 may perform a user input for setting an operation of cooking apparatus through the UI 217. Alternatively, after performing the user input for the setting, the user 21 may further perform a user input for finishing the setting input.

When the user input is detected, the processor 4120 of the user terminal 20 may generate matching information in which the food is matched with at least one cooking apparatus 30. In addition, the processor 4120 may generate guide information for guiding an operation of the cooking apparatus 30. Herein, the matching information may be preemptively generated after performing the user input in operation of FIG. 3B and before displaying the UI 217 in operation of FIG. 3C.

Thereafter, the processor 4120 of the user terminal 20 may perform at least one of a function of controlling an operation of the cooking apparatus 30 and a function of transmitting guide information for controlling the operation of the cooking apparatus 30.

For example, the processor 4120 of the user terminal 20 may control the communication unit 4190 to transmit the control command 219 to the cooking apparatus 30. Alternatively, the processor 4120 may control the communication unit 4190 to transmit, to the refrigerator 10, guide information 301 for controlling the operation of the cooking apparatus. In this case, the guide information 301 may include the matching information. According to various embodiments, the guide information 301 may further include visual information and/or auditory information for guiding a method of cooking the food by using the cooking apparatus 30, based on the matching information and the guide information.

In operation of FIG. 3D, the refrigerator 10 may receive the guide information 301. The processor 3110 of the refrigerator 10 may control, based on the guide information 301, the display 3170 to display a UI 303 for guiding to control the operation of the cooking apparatus 30. The user 11 of the refrigerator 10 may cook the food with reference to the UI 303. For example, with reference to information included in the UI 303, the user 11 may withdraw the food from the refrigerator 10, move the withdrawn food to the cooking apparatus 30, turn the cooking apparatus 30 on, and operate the cooking apparatus 300 in which the food is ready.

According to various embodiments, as in operation of FIG. 3E, the refrigerator 10 may directly control the operation of the cooking apparatus 30 based on the guide information 301. For example, in order for the user 11 to easily cook, the refrigerator 10 may control the communication unit 3120 to transmit a control command 305 for the cooking apparatus 30 (e.g., a wake-up command for turning the cooking apparatus 30 on) to the cooking apparatus 30. Alternatively, the refrigerator 10 may control the communication unit 3120 to transmit, to the cooking apparatus, the control command 305 for setting a cooking mode and/or a cooking time based on the guide information 301. Alternatively, the refrigerator 10 may control the communication unit 3120 to transmit, to the cooking apparatus 30, the control command based on the guide information 301 when a certain time comes. Herein, the certain time may be preset by a user through the user terminal 20 or the refrigerator 10. The certain time may be set to correspond to, for example, a meal time or a snack time of a user.

FIG. 4 illustrates an operation of a system including an electronic device and a refrigerator, according to various embodiments of the present disclosure.

In FIG. 4, the processor 3110 of the refrigerator 10 may control the display 3170 to display a UI 401 for matching food stored in the refrigerator 10 with at least one cooking apparatus 30. For example, the processor 3110 of the refrigerator 10 may control the display 3170 to display a home screen image (not shown) including an execution shortcut icon of an application capable of setting an operation of a cooking apparatus. When a user input for selecting the shortcut icon is received, the processor 3110 of the refrigerator 10 may control the display 3170 to display the UI 401 for matching food with the at least one cooking apparatus 30.

Figure 4A:
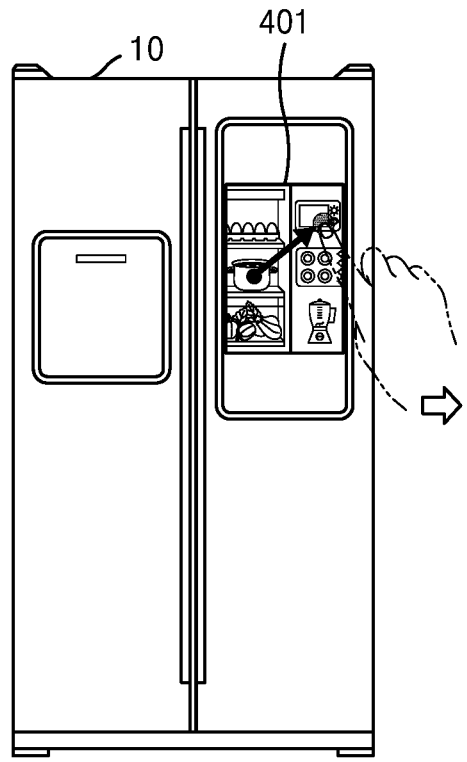

In operation of FIG. 4A, the refrigerator 10 may generate matching information in which the food is matched with the at least one cooking apparatus, in response to a user input for matching the food with the at least one cooking apparatus through the UI 401.

Figure 4B:
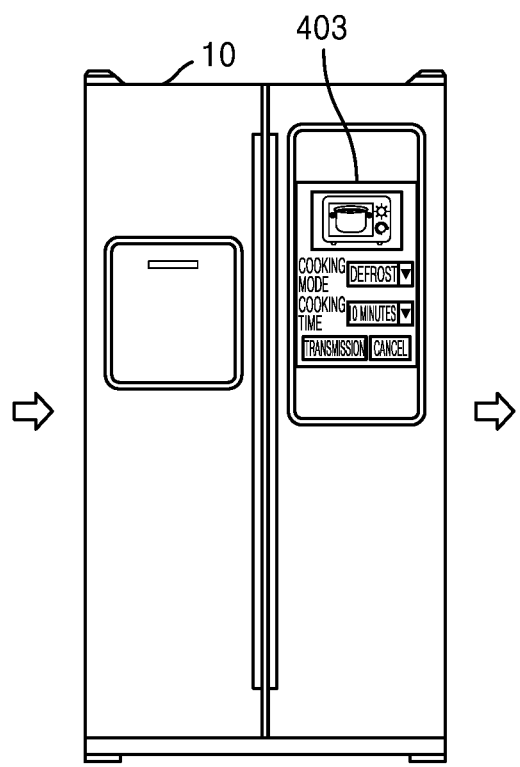

Thereafter, in operation of FIG. 4B, the refrigerator 10 may control the display 3170 to display a UI 403 for setting an operation of the cooking apparatus 30. In operation of FIG. 4B, when a user input for setting an operation of the cooking apparatus through the UI 403 is detected, the processor 3110 of the refrigerator 10 may generate a control command for controlling the operation of the cooking apparatus 30 or guide information required to control the operation of the cooking apparatus 30.

Figure 4C:
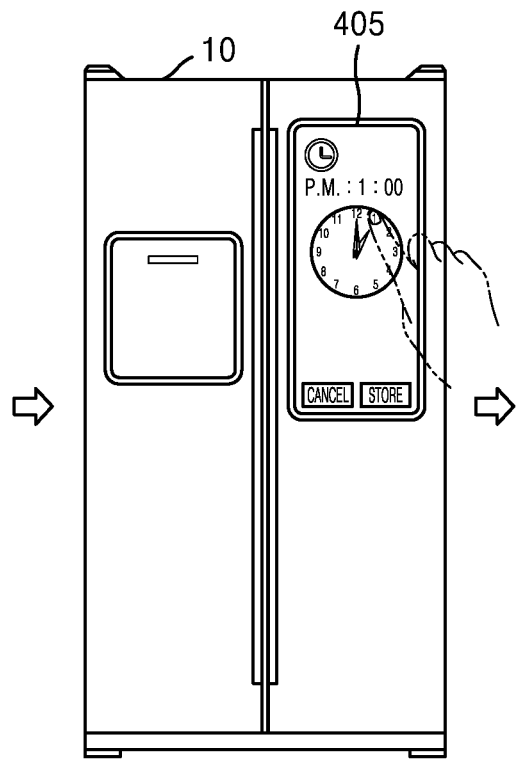

Thereafter, in operation of FIG. 4C, the refrigerator 10 may control the display 3170 to display a UI 405 for setting a time at which the control command is to be transmitted to the cooking apparatus 30 or a time at which the guide information is to be provided through the display 3170.

Figure 4D:
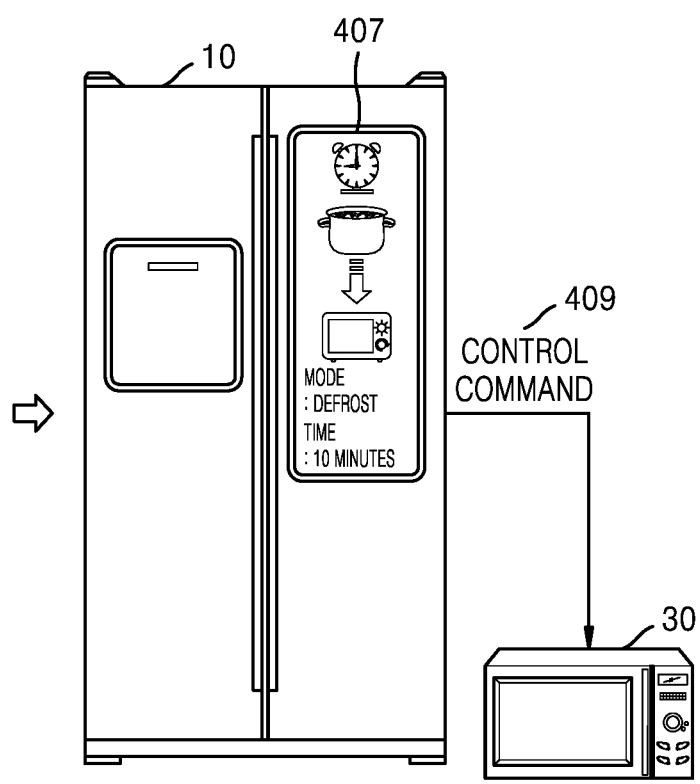

Thereafter, when the set time comes, as in operation of FIG. 4D, the processor 3110 of the refrigerator 10 may perform at least one of a function of controlling the operation of the cooking apparatus or a function of providing a guide for controlling the operation of the cooking apparatus. For example, when the set time comes, the processor 3110 of the refrigerator 10 may control the display 3170 to display a UI 407 for guiding to control the operation of the cooking apparatus 30. Alternatively, when the set time comes, the processor 3110 of the refrigerator 10 may transmit, to the cooking apparatus 30, a control command 409 for controlling the operation of the cooking apparatus 30.

FIG. 5 illustrates an operation of a system including a user terminal and a refrigerator, according to various embodiments of the present disclosure.

In FIG. 5, the refrigerator 10 may photograph food stored in the refrigerator 10 when an event signal is generated or periodically.

For example, when an event signal according to opening of a door of the refrigerator 10 is generated, an event signal according to recognition of a user on the front of the refrigerator 10 is generated, a food image request signal is received from the user terminal 20, or a time at which guide information for cooking food is to be provided comes, the refrigerator 10 may photograph food stored in a storage chamber thereof. Alternatively, the refrigerator 10 may photograph food stored in a storage chamber of the refrigerator 10 and previously store the photographed food in the memory 3190 of the refrigerator 10, periodically (e.g., before a breakfast time (between 5 o'clock and 7 o'clock), at a lunch time (between 11 o'clock and 13 o'clock), or before a dinner time (between 17 o'clock and 19 o'clock). Alternatively, food stored in a third storage chamber (e.g., a food warehouse, a kitchen shelf, or the like) 401 besides the refrigerator 10 may be photographed. In this case, the third storage chamber 401 may include a camera so that the camera photographs food stored in the third storage chamber 401, periodically or when an event occurs.

Figure 5A:
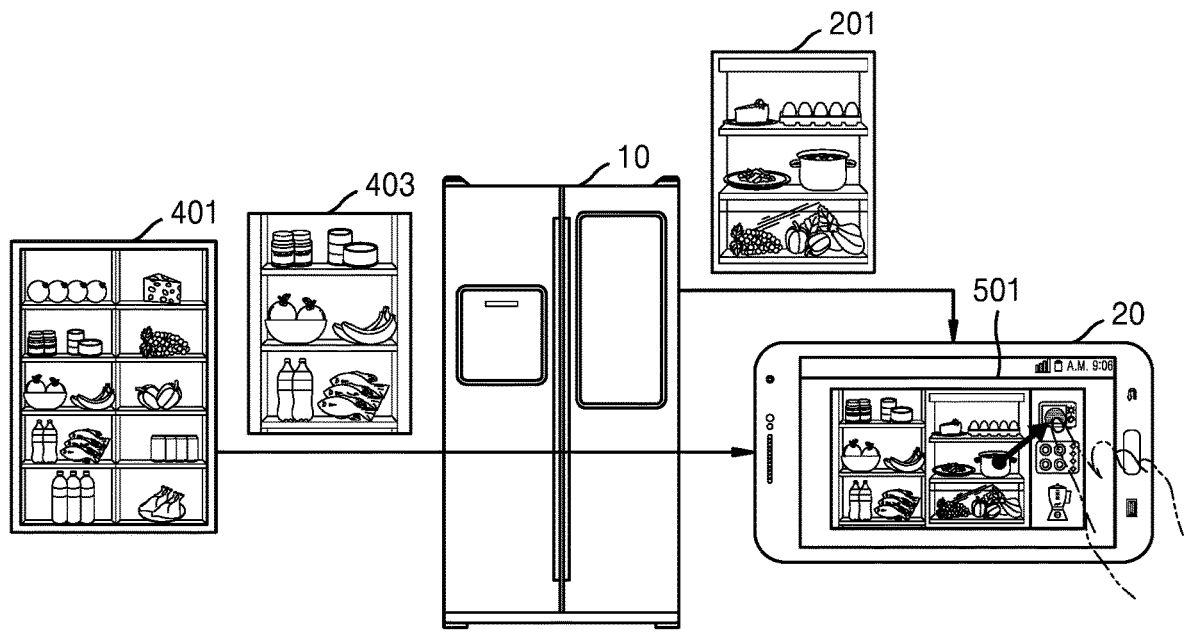

In this case, as in operation of FIG. 5A, each of the food image 201 obtained by photographing food stored in the refrigerator 10 and a food image 403 obtained by photographing food stored in the third storage chamber 401 may be transmitted to the user terminal 20.

For example, when an event signal is generated, the processor 3110 of the refrigerator 10 may control the communication unit 3120 to transmit, to the user terminal 20, the food image 201 including food stored in the storage chamber. In addition, when an event signal is generated, a device including the camera in the third storage chamber 401 may transmit, to the user terminal 20, the food image 403 obtained by photographing food stored in the third storage chamber 401.

The processor 4120 of the user terminal 20 which has received the food images 201 and 403 may display a UI 501 for matching food included in the received food images 201 and 403 with at least one cooking apparatus. The UI 501 may correspond to, for example, the UI 203 of FIGS. 2 and 3 and the UI 401 of FIG. 4.

Figure 5B:
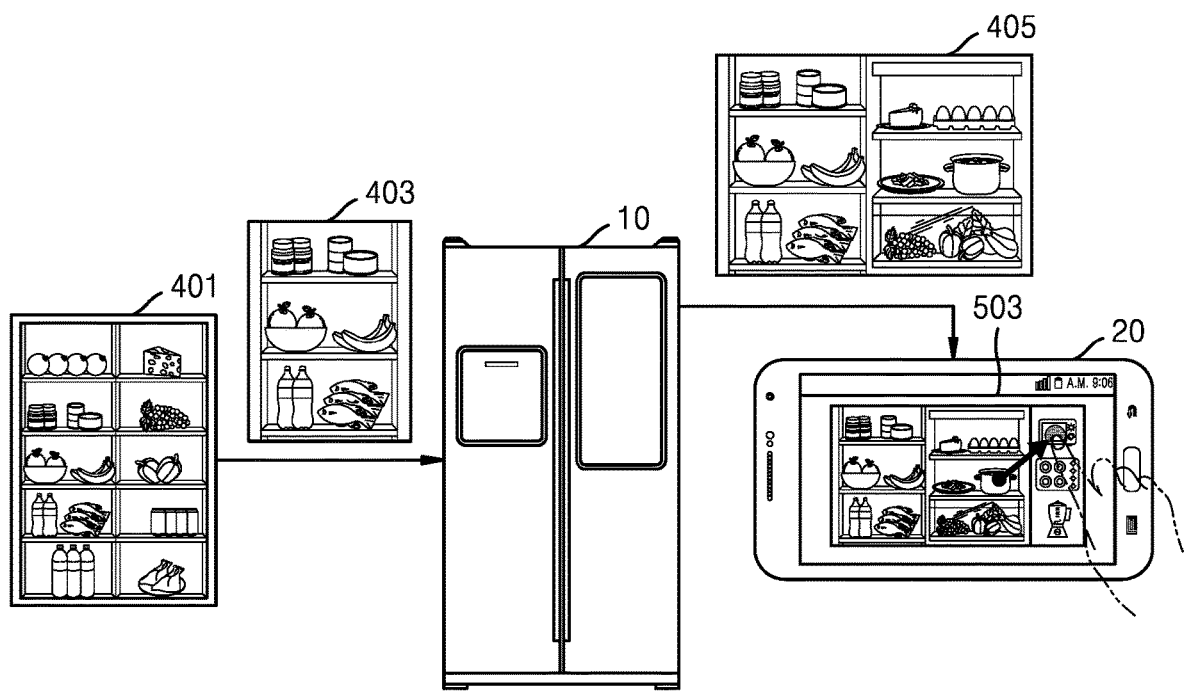

As another example, as in operation of FIG. 5B, the refrigerator 10 may receive the food image 403 obtained by photographing food stored in the third storage chamber 401 and transmit, to the user terminal 20, both the food image 201 obtained by photographing food stored in the refrigerator 10 and the received food image 403.

For example, when an event signal is generated, the device including the camera in the third storage chamber 401 may control a communication unit to transmit, to the user terminal 20, the food image 403 obtained by photographing food stored in the third storage chamber 401. When the food image 403 is received, the processor 3110 of the refrigerator 10 may generate a total food image 405 by combining the food image 201 obtained by photographing food stored in the refrigerator 10 and the received food image 403. In addition, the processor 3110 of the refrigerator 10 may control the communication unit 3120 to transmit the total food image 405 to the user terminal 20.

The processor 4120 of the user terminal 20 which has received the total food image 405 may display a UI 503 for matching food included in the total food image 405 with at least one cooking apparatus. The UI 503 may correspond to, for example, the UI 203 of FIGS. 2 and 3 and the UI 401 of FIG. 4.

Figures 1, 6B:
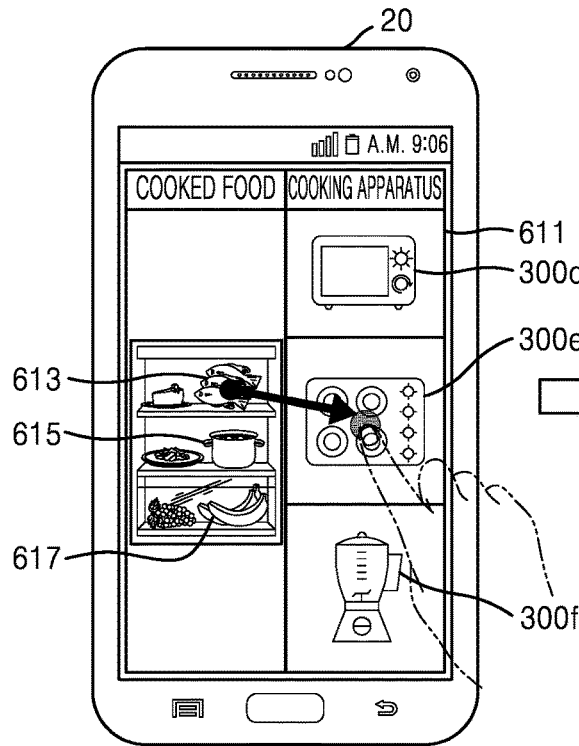
Figures 2, 6B:
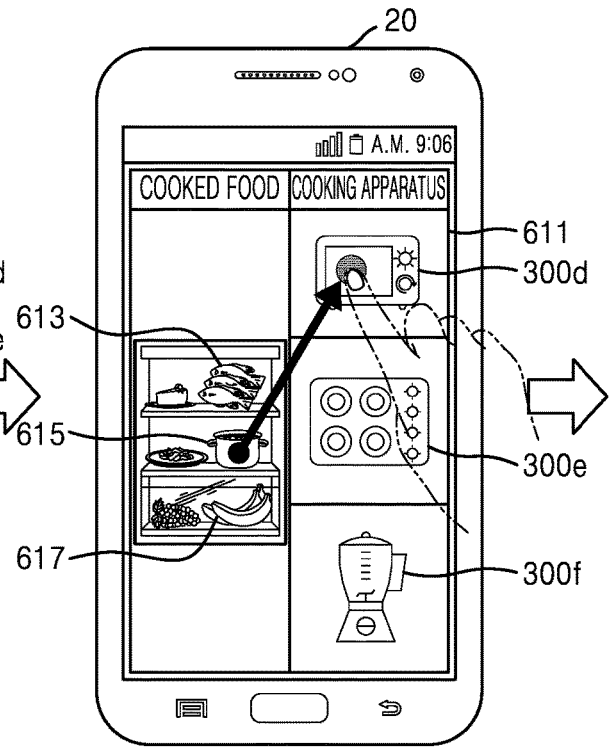
Figures 4, 6B:
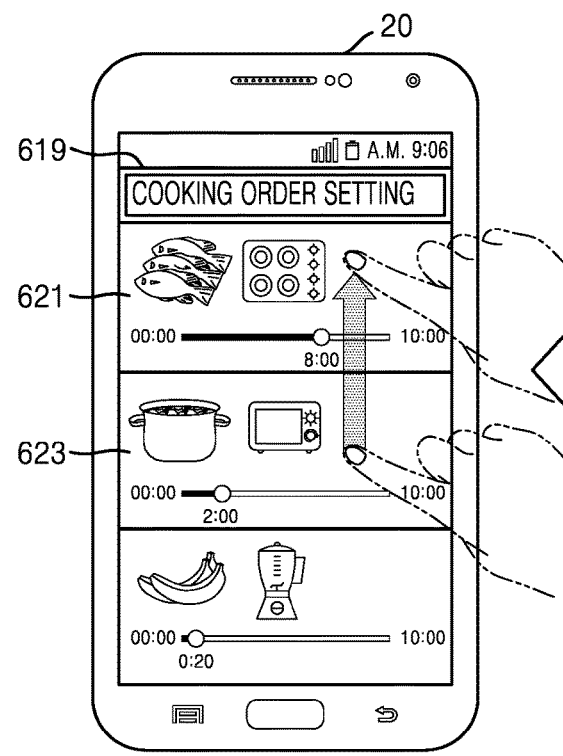
Figures 3, 6B:
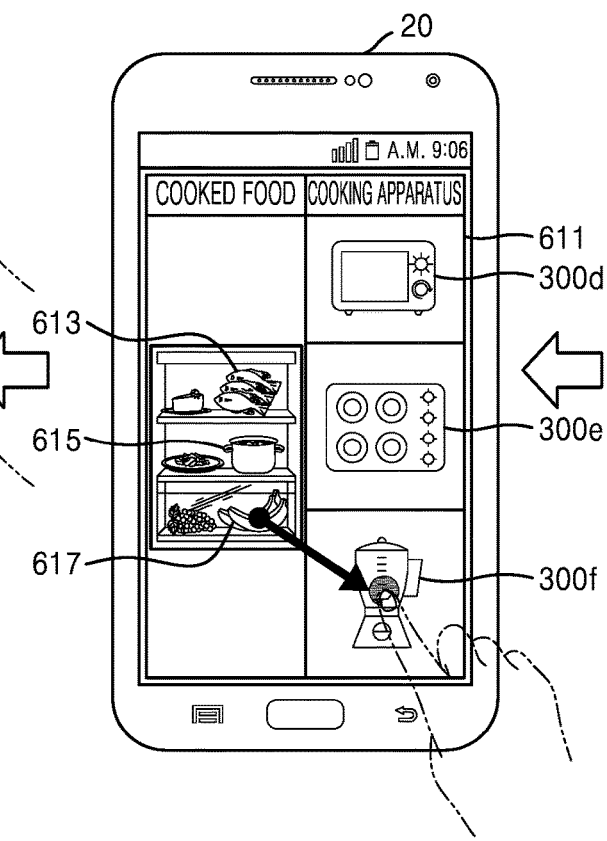

FIGS. 6A and 6B illustrate UIs of a user terminal, according to various embodiments of the present disclosure.

In FIG. 6A, the processor 4120 of the user terminal 20 may control the display 4160 to display a UI 601 for matching food 603 stored in the refrigerator 10 with a plurality of cooking apparatuses 300a, 300b, and 300c.

For example, the processor 4120 of the user terminal 20 may control the display 4160 to display, at one side, a food image including the food 603 stored in the refrigerator 10 and display, at the other side, the plurality of cooking apparatuses matchable with the food 603. The plurality of cooking apparatuses may be located at the same place as the refrigerator 10 (e.g., at home where the refrigerator 10 is located).

In this case, when the user 21 of the user terminal 20 selects one food 603 from the food image, the processor 4120 of the user terminal 20 may control the display 4160 to selectively display at least one cooking apparatus matchable with the food among the plurality of cooking apparatuses. For example, the processor 4120 of the user terminal 20 may determine at least one cooking apparatus 300a, 300b, and 300c matchable with the food 603, which is selected from among cooking apparatuses at home. According to various embodiments, the processor 4120 of the user terminal 20 may determine at least one cooking apparatus matchable with the food among the plurality of cooking apparatuses by using additional information (e.g., cooking information provided by a manufacturer of the food 603, food cooking information provided by a chef, and food cooking information provided by other users who have cooked the food) related to the food 603.

The processor 4120 of the user terminal 20 may control the display 4160 to display the UI 601 including the determined at least one cooking apparatus 300*a*, 300*b*, and 300*c*.

In this situation, the user 21 may match the food 603 with each of the plurality of cooking apparatuses 300*a*, 300*b*, and 300*c* through the UI 601. For example, as in operations of FIGS. 6A-1, 6A-2, and 6A-3, the user 21 may sequentially match the food 603 with the first cooking apparatus 300*a*, the second cooking apparatus 300*b*, and the third cooking apparatus 300*c*. Accordingly, as in operation of FIG. 6A-4, the user terminal 20 may control the display 4160 to display a UI 605 in which a cooking sequence of each of the plurality of cooking apparatuses 300*a*, 300*b*, and 300*c* with which the food 603 is matched is displayed. In operation of FIG. 6A-4, the user 21 may change the cooking sequence of each of the plurality of cooking apparatuses 300*a*, 300*b*, and 300*c* through the UI 605. For example, a cooking sequence of each of the matched plurality of cooking apparatuses 300*a*, 300*b*, and 300*c* may be changed by dragging a second matching information UI 609 to a location of a first matching information UI 607.

Thereafter, when the user selects each matching information, the processor 4120 may control the display 4160 to display a UI (not shown) for setting an operation of a cooking apparatus included in the matching information. As another example, in operations of FIGS. 6A-1, 6A-2, and 6A-3, every time the user matches the food 603 with one cooking apparatus among the plurality of cooking apparatuses 300*a*, 300*b*, and 300*c*, the processor 4120 may control the display 4160 to display a UI (not shown) for setting an operation of the matched cooking apparatus.

As another example, in FIG. 6B, the processor 4120 of the user terminal 20 may control the display 4160 to display a UI 611 for matching each of a plurality of foods 613, 615, and 617 in the refrigerator 10 with each of a plurality of cooking apparatuses (e.g., first to third cooking apparatuses?) 300*a*, 300*b*, and 300*c*. The plurality of cooking apparatuses may be located at the same place as the refrigerator 10 (e.g., at home where the refrigerator 10 is located).

In this situation, the user 21 of the user terminal 20 may match each of the plurality of foods 613, 615, and 617 with each of the plurality of cooking apparatuses 300*a*, 300*b*, and 300*c*. For example, the user 21 may match the first food 613 with the second cooking apparatus 300*e* in operation of FIG. 6B-1, match the second food 615 with the first cooking apparatus 300*d* in operation of FIG. 6B-2, and match the third food 617 with the third cooking apparatus 300*f* in operation of FIG. 6B-3. Accordingly, as in operation of FIG. 6B-4, the user terminal 20 may control the display 4160 to display a UI 619 in which a cooking sequence of each of the plurality of cooking apparatuses 300*d*, 300*e*, and 300*f* with which each of the plurality of foods 613, 615, and 617 is matched is displayed. In operation of FIG. 6B-4, the user 21 may change the cooking sequence of each of the plurality of cooking apparatuses 300*d*, 300*e*, and 300*f* through the UI 619. For example, a cooking sequence of each of the matched plurality of cooking apparatuses 300*d*, 300*e*, and 300*f* may be changed by dragging a second matching information UI 623 to a location of a first matching information UI 621.

Thereafter, when the user selects each matching information, the processor 4120 may control the display 4160 to display a UI (not shown) for setting an operation of a cooking apparatus included in the matching information. As another example, in operations of FIGS. 6B-1, 6B-2, and 6B-3, every time the user matches one food among the plurality of foods 613, 615, and 617 with one cooking apparatus among the plurality of cooking apparatuses 300*d*, 300*e*, and 300*f*, the processor 4120 may control the display 4160 to display a UI (not shown) for setting an operation of the matched cooking apparatus.

In FIGS. 6A and 6B, when a cooking sequence is determined, the user terminal 20 may perform at least one of a function of controlling an operation of a cooking apparatus or a function of transmitting guide information for controlling the operation of the cooking apparatus, according to the cooking sequence. For example, the user terminal 20 may transmit a control command for a cooking apparatus to the cooking apparatus according to the cooking sequence. Alternatively, the user terminal 20 may sequentially transmit guide information for controlling operations of cooking apparatuses, to the refrigerator 10 according to the cooking sequence. For example, when notification information that food has been moved to one cooking apparatus among a plurality of cooking apparatuses is received, or notification information that the food is completely cooked in the one cooking apparatus is received, the user terminal may control the communication unit 4190 to transmit a control command to a cooking apparatus for a next sequence or may transmit guide information for cooking to the cooking apparatus for the next sequence or the refrigerator 10.

Figure 7:
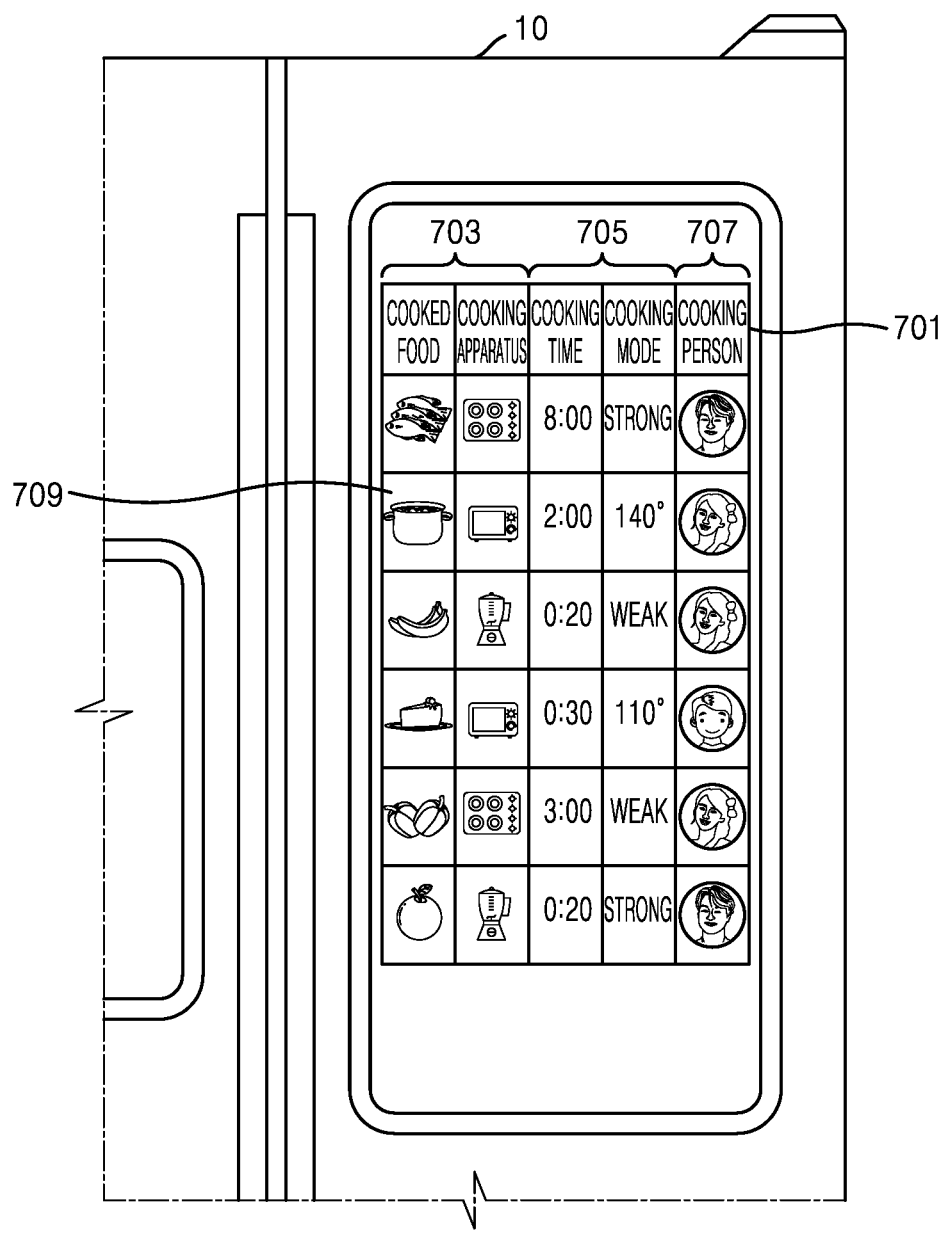
FIGS. 7, 8A, and 8B illustrate UIs of a refrigerator, according to various embodiments of the present disclosure.

FIG. 7 illustrates a UI of a refrigerator, according to various embodiments of the present disclosure.

According to an embodiment of the present disclosure, by using the user terminal 20 or the refrigerator 10, food stored in the refrigerator 10 may be matched with a cooking apparatus, and an operation of the matched cooking apparatus may be set. In this case, as shown in FIG. 7, the processor 3110 of the refrigerator 10 may control the display 3170 to display a UI 701 including matching information 703 and guide information 705 for guiding an operation of a matched cooking apparatus. Herein, the matching information 703 may be, for example, information in which food is matched with a cooking apparatus, and the guide information 705 may include, for example, a cooking time and cooking mode information using a cooking apparatus for each food.

In addition, the processor 3110 of the refrigerator 10 may control the display 3170 to display the UI 701 including the matching information 703 and the guide information 705 for each of a plurality of users 707 who are supposed to take food. For example, reference numeral 709 of FIG. 7 may indicate that a user who is supposed to take food cooks the food in a pot for two minutes in a temperature mode of 140 degrees by using a microwave (or an oven).

Figure 8A:
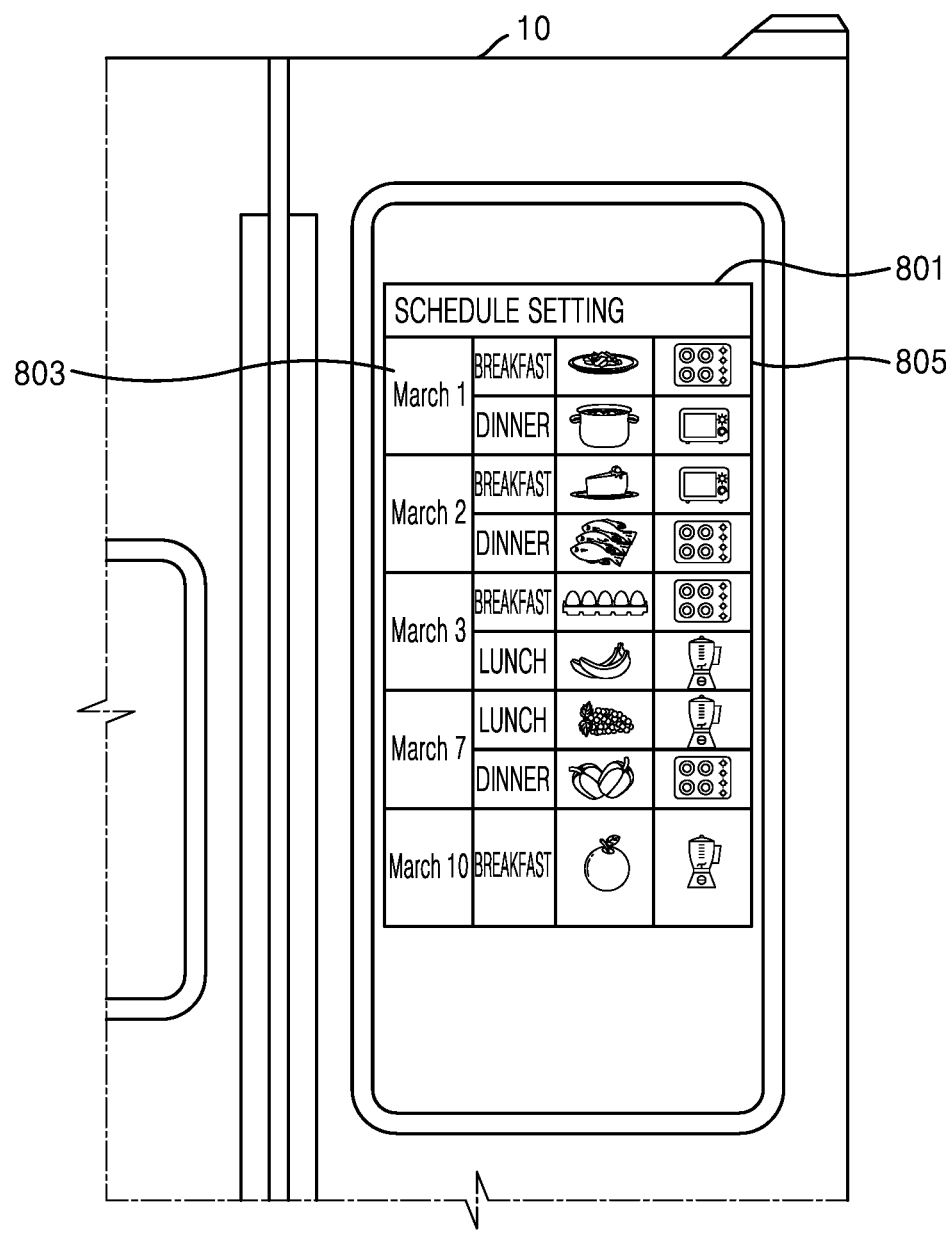
Figure 8B:
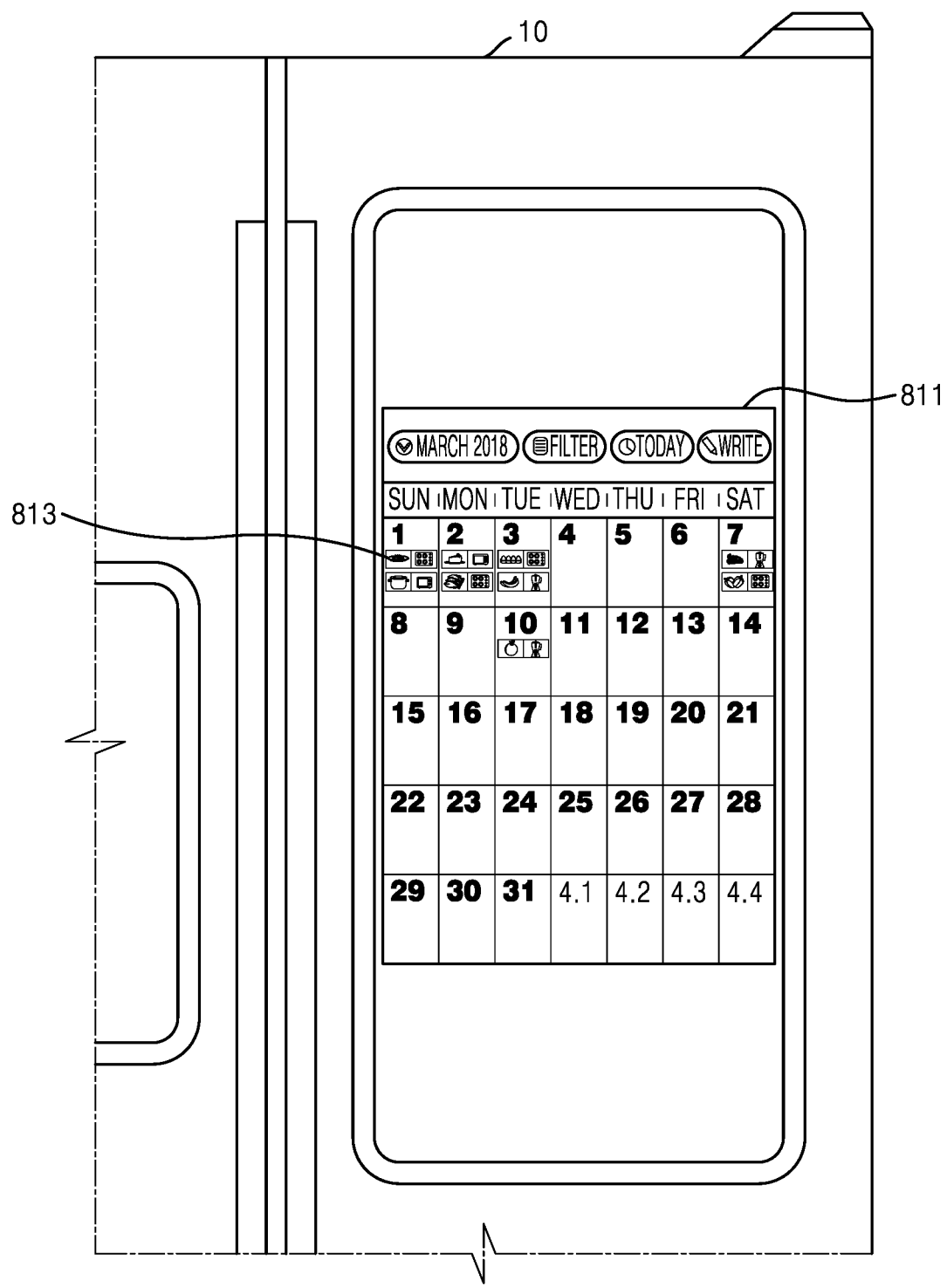

FIGS. 8A and 8B illustrate UIs of a refrigerator, according to various embodiments of the present disclosure.

According an embodiment of the present disclosure, food stored in the refrigerator 10 may be matched with a cooking apparatus by being identified for each time (e.g., date, breakfast/lunch/dinner), and an operation of the matched cooking apparatus may be set. For example, by using the user terminal 20 or the refrigerator 10, a plurality of foods may be matched with a plurality of cooking apparatuses, respectively, and an operation of each of the matched plurality of cooking apparatuses may be set. In this case, some of pieces of matching information and guide information for cooking may be grouped, and a food taking time may be designated for the group.

In FIG. 8A, the processor 3110 of the refrigerator 10 may control the display 3170 to display a UI 801 including at least one of matching information and guide information for each time.

For example, reference numeral 803 of FIG. 8A may indicate that a user who is supposed to take food cooks food on a dish by using a gas stove for a breakfast on March first and cook food in a pot by using an oven for a dinner on March first. In this case, in response to a user input for selecting a matching information UI 805, the processor 3110 of the refrigerator 10 may control the display 3170 to display a UI (not shown) for guiding an operation of a cooking apparatus included in matching information or changing a preset operation of a cooking apparatus.

According to various embodiments, as shown in FIG. 8B, the processor 3110 of the refrigerator 10 may control the display 3170 to display a UI 811 of a calendar format as a UI including matching information and guide information for cooking for each time. In this case, in a date column of the calendar, identification information 813 (e.g., an icon, a graphic, or the like) representing at least one of matching information and guide information for cooking may be displayed. In this case, in response to a user input for selecting a date column or the identification information 813 of the calendar, the processor 3110 of the refrigerator 10 may control the display 3170 to display a UI (not shown) for transmitting a control command for controlling a cooking apparatus 30 corresponding to the selected date or identification information or guiding a control of the cooking apparatus 30.

FIG. 9 illustrates an operation of a refrigerator, according to various embodiments of the present disclosure.

Figure 9A:
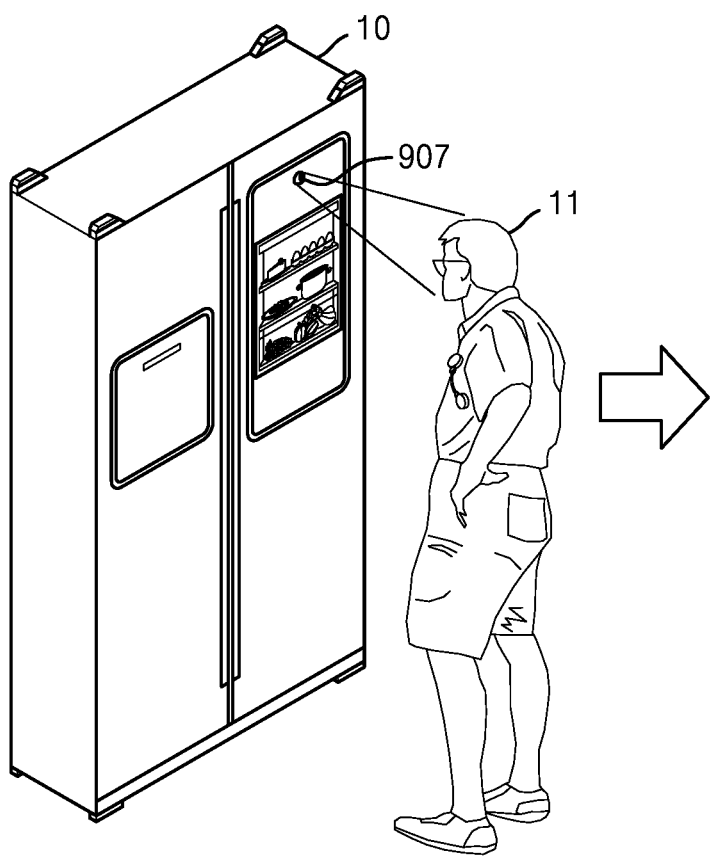
FIGS. 9A, 9B, and 9C illustrates an operation of a refrigerator, according to various embodiments of the present disclosure.

In operation of FIG. 9A, when the user 11 of the refrigerator 10 approaches the front of the refrigerator 10, the refrigerator 10 may detect the user located at the front thereof.

To this end, the refrigerator 10 may include a user approach detection unit 907 configured to detect a user located at the front thereof. The user approach detection unit 907 may include one of a microphone located on the front surface of a door, a front camera tilted at a set angle, and a proximity sensor. Alternatively, the user approach detection unit 907 may include a combination of the microphone located on the front surface of a door, the front camera tilted at a set angle, and the proximity sensor.

The processor 3110 of the refrigerator 10 may detect a user's refrigerator approach by using the user approach detection unit 907. For example, when a user's voice is detected through the microphone, the processor 3110 may identify (or authenticate) the user by recognizing the received voice.

As another example, the front camera tilted at a set angle may photograph a user's presence (or the user's motion) at the front of the refrigerator. The processor 3110 may identify (or authenticate) the user by recognizing the captured image (e.g., a face). The proximity sensor may detect an approach of a user at the front of the refrigerator 10.

The user approach detection unit 907 may detect a user's approach through a single sensor or a combination of a plurality of sensors. In addition, the user approach detection unit 907 may identify an approaching user through a single sensor (e.g., through the microphone or the camera) or a combination of a plurality of sensors (e.g., a combination of the proximity sensor and the camera, a combination of the proximity sensor and the microphone, or the like).

The user approach detection unit 907 may output, to the processor 3110, an electrical signal corresponding to detection of a user's approach. Alternatively, the user approach detection unit 907 may output, to the memory 3190, an electrical signal corresponding to detection of a user's approach.

Figure 9B:
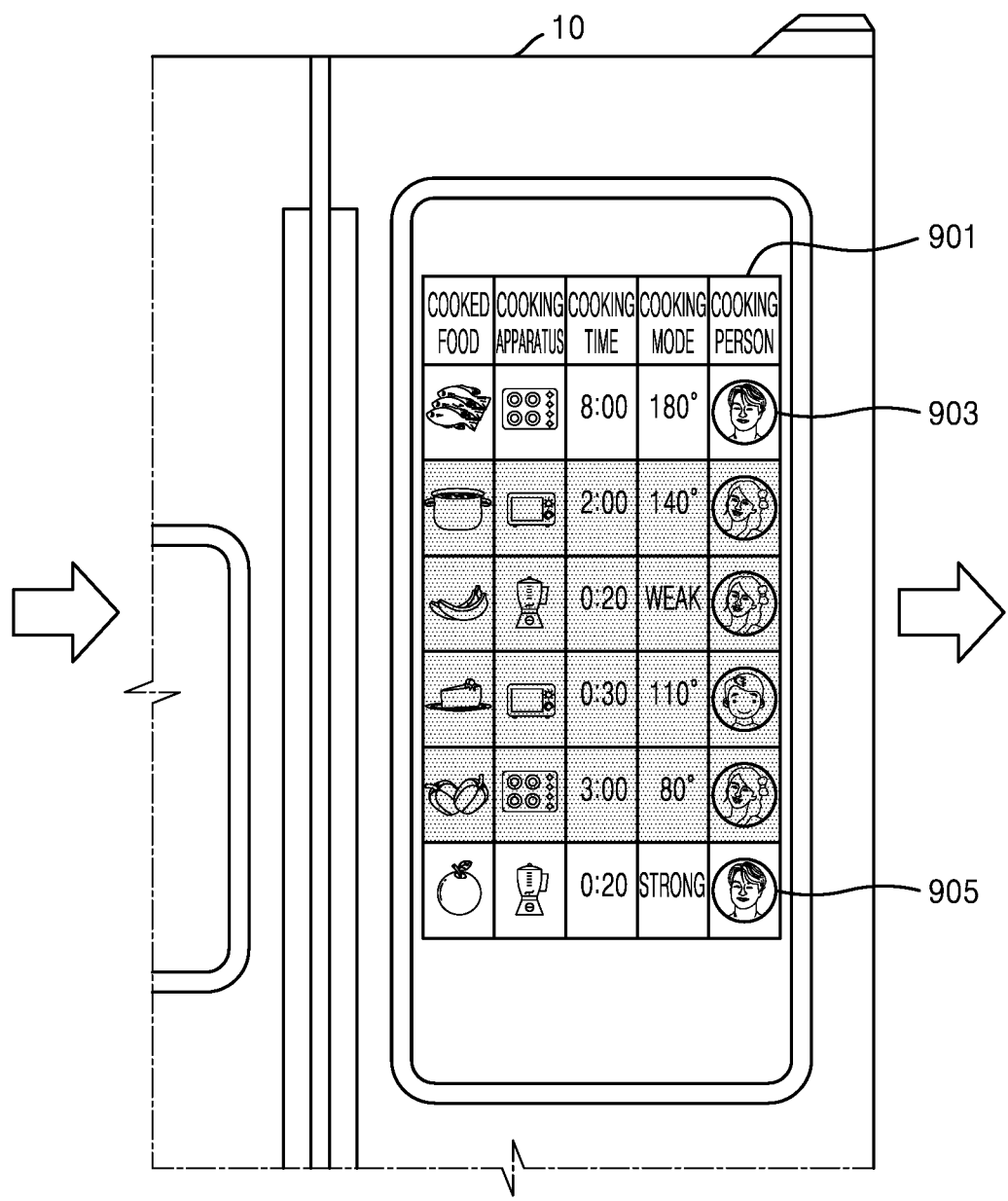

When the user is recognized by the user approach detection unit 907, as in operation of FIG. 9B, the refrigerator 10 may control the display 3170 to display a UI 901 in which pieces of cooking information 903 and 905 corresponding to the recognized user (11) among a plurality of pieces of cooking information are highlighted. Herein, the cooking information may include matching information in which food stored in the refrigerator 10 is matched with a cooking apparatus, according to an embodiment of the present disclosure. Alternatively, the cooking information may include guide information for controlling the matched cooking apparatus, according to an embodiment of the present disclosure.

According to various embodiments, the highlighting of the pieces of cooking information 903 and 905 may include displaying or marking the pieces of cooking information 903 and 905 corresponding to the recognized user 11 with a different shade or a different color from those of the other pieces of cooking information. According to various embodiments, the refrigerator 10 may control the display 3170 to display a UI (not shown) in which only the pieces of cooking information 903 and 905 corresponding to the recognized user 11 among a plurality of pieces of cooking information.

Figure 9C:
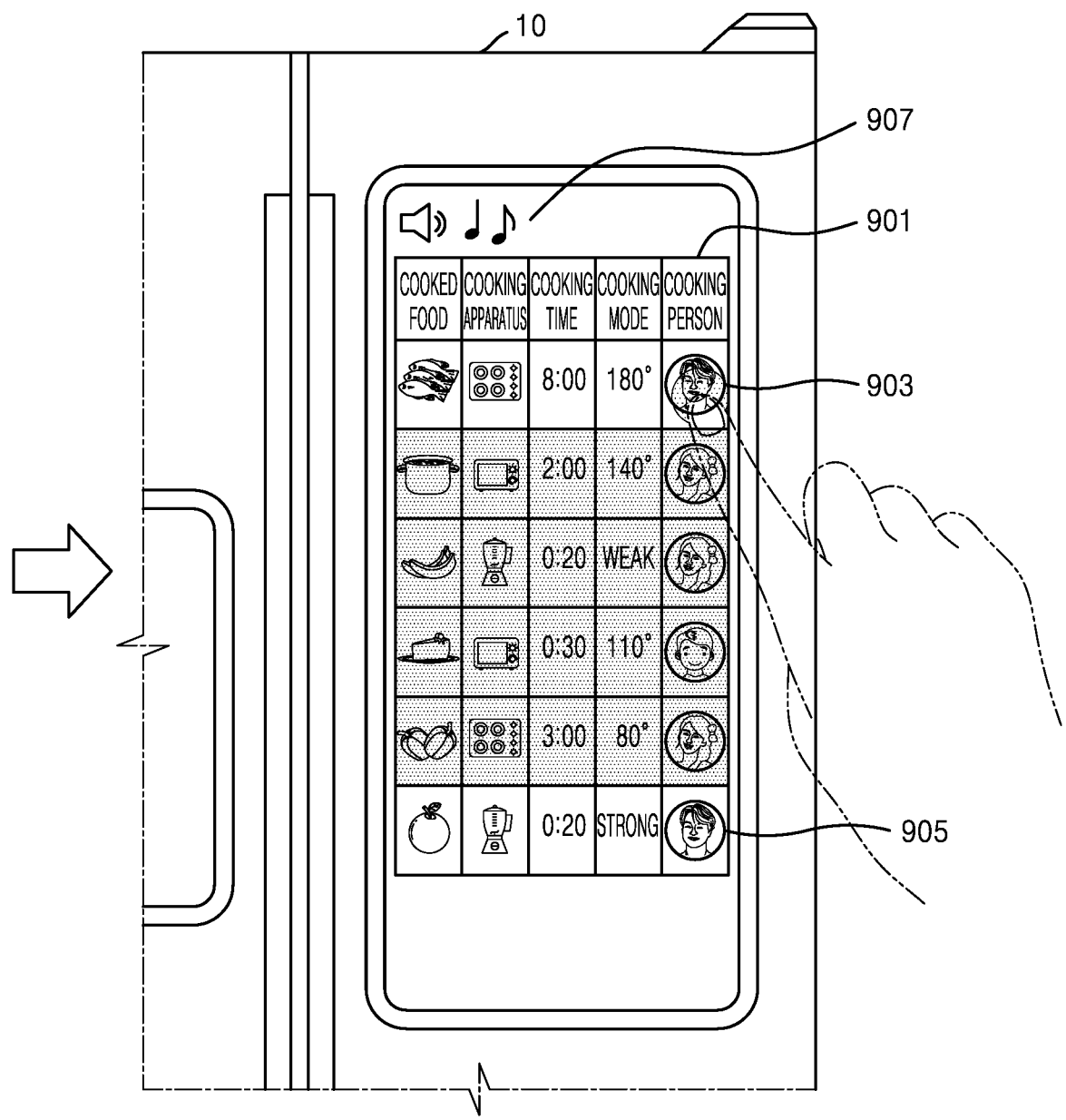

In operation of FIG. 9C, upon receiving a user input for selecting one piece of cooking information 903 from the pieces of cooking information 903 and 905, the processor 3110 of the refrigerator 10 may provide the content of the cooking information by using a sound. In this case, an icon 907 indicating that the cooking information is being provided using a sound may be displayed together with the UI 901. Alternatively, the processor 3110 of the refrigerator 10 may control the display 3170 to display a detailed description related to cooking information.

Figure 10:
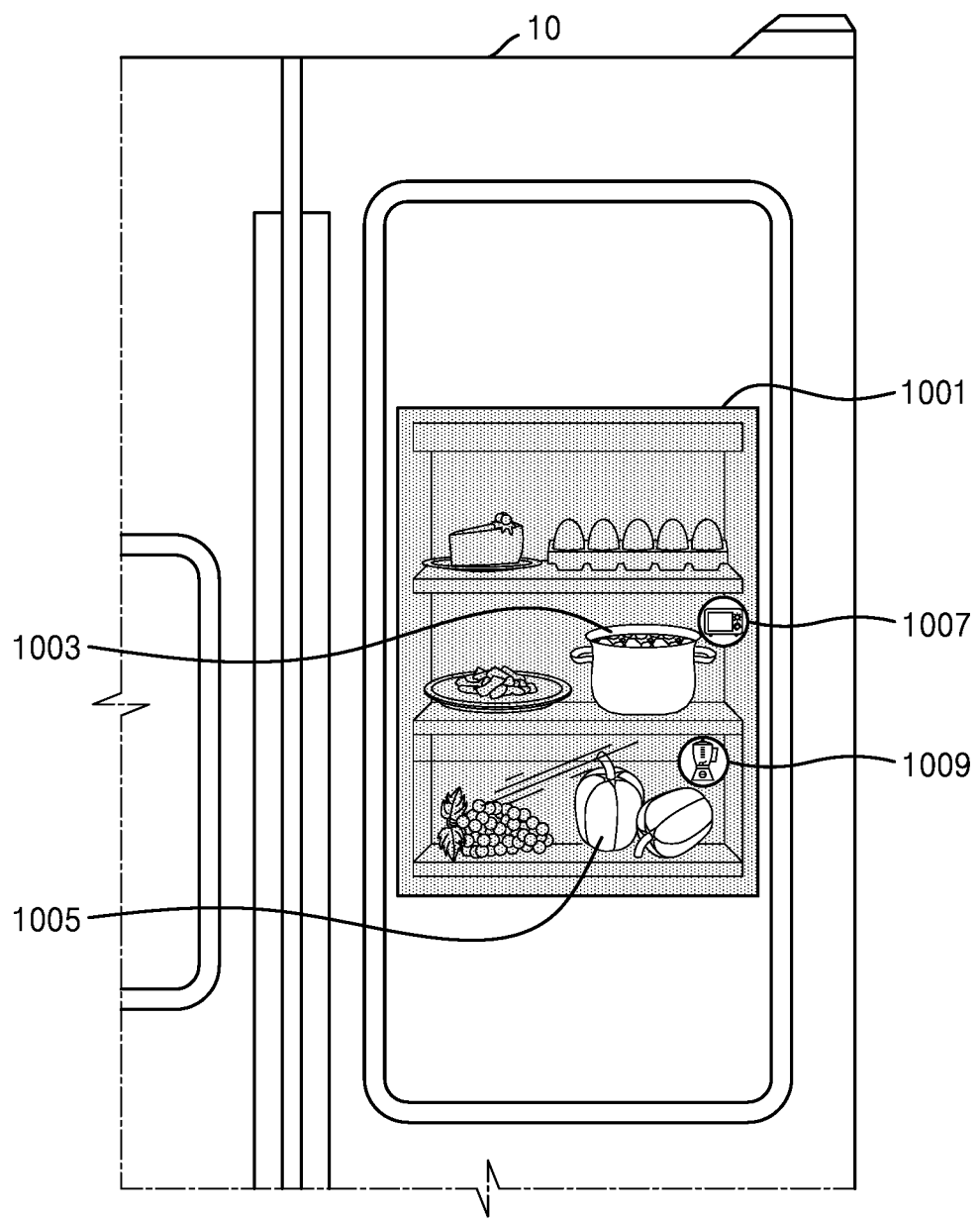
FIG. 10 illustrates a UI of a refrigerator, according to various embodiments of the present disclosure.

FIG. 10 illustrates a UI of a refrigerator, according to various embodiments of the present disclosure.

In FIG. 10, the refrigerator 10 may control the display 3170 to display a food image including food stored in the refrigerator 10.

According an embodiment of the present disclosure, when food is matched with a cooking apparatus, the processor 3110 of the refrigerator 10 may control the display 3170 to display a UI 1001 in which foods 1003 and 1005 with which a cooking apparatus is matched among foods included in the food image are highlighted. In this case, the processor 3110 of the refrigerator 10 may control the display 3170 to also display identifiers (or icons) 1007 and 1009 respectively matched with the foods 1003 and 1005 with which a cooking apparatus is matched.

According to various embodiments, upon receiving a use input for selecting one identifier of the identifiers 1007 and 1009, the processor 3110 of the refrigerator 10 may control the display 3170 to display guide information for controlling a cooking apparatus corresponding to the selected identifier.

Figure 11:
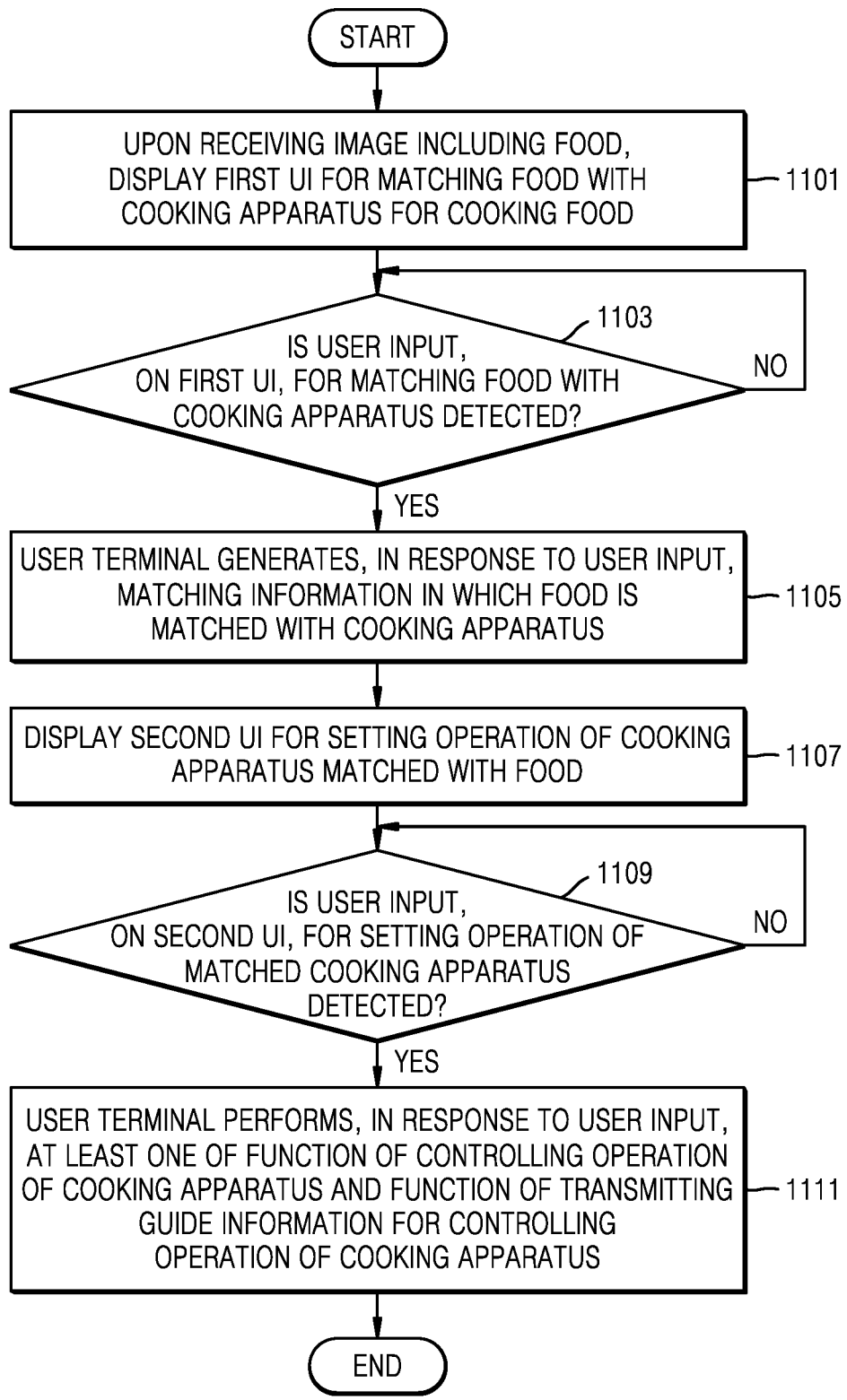
FIG. 11 is a flowchart with respect to a user terminal according to various embodiments of the present disclosure.

FIG. 11 is a flowchart with respect to a user terminal according to various embodiments of the present disclosure.

In operation 1101, upon receiving an image including food, the user terminal 20 may display a first UI for matching the food with a cooking apparatus for cooking the food. For example, the image including the food may be an image captured in a refrigerator storing the food or a storage place storing the food.

In operation 1103, the user terminal 20 may determine whether to detect a user input, on the first UI, for matching food with a cooking apparatus.

When the user input is detected (1103-Y), in operation 1105, the user terminal 20 may generate, in response to the user input, matching information in which the food is matched with the cooking apparatus.

In operation 1107, the user terminal 20 may display a second UI for setting an operation of the cooking apparatus matched with the food.

In operation 1109, the user terminal 20 may determine whether to detect a user input, on the second UI, for setting an operation of the matched cooking apparatus.

When the user input is detected (1109-Y), in operation 1111, the user terminal 20 may perform, in response to the user input, at least one of a function of controlling an operation of the cooking apparatus and a function of transmitting guide information for controlling the operation of the cooking apparatus. For example, the user terminal 20 may transmit, to the cooking apparatus, a control command for controlling the operation of a control device. Alternatively, the user terminal 20 may transmit the guide information to the cooking apparatus or the refrigerator storing the food.

According to various embodiments, the user terminal 20 may transmit the generated matching information only to the refrigerator 10. In this case, upon receiving notification information that the food has been moved from the refrigerator 10 storing the food or the cooking apparatus based on the transmission of the matching information, the user terminal 20 may display the second UI for setting an operation of the matched cooking apparatus. In this case, upon receiving the notification information, the user terminal 20 may display a notification message that the food has been moved.

According to various embodiments, the user terminal 20 may select at least one cooking apparatus matchable with the food from among a plurality of cooking apparatuses. Thereafter, the user terminal 20 may display a UI including the food and the selected at least one cooking apparatus.

According to various embodiments, the user terminal 20 may display a UI for matching a plurality of foods with a plurality of cooking apparatuses. In addition, the user terminal 20 may display a UI for changing a cooking sequence of each of the matched plurality of foods and plurality of cooking apparatuses.

Figure 12:
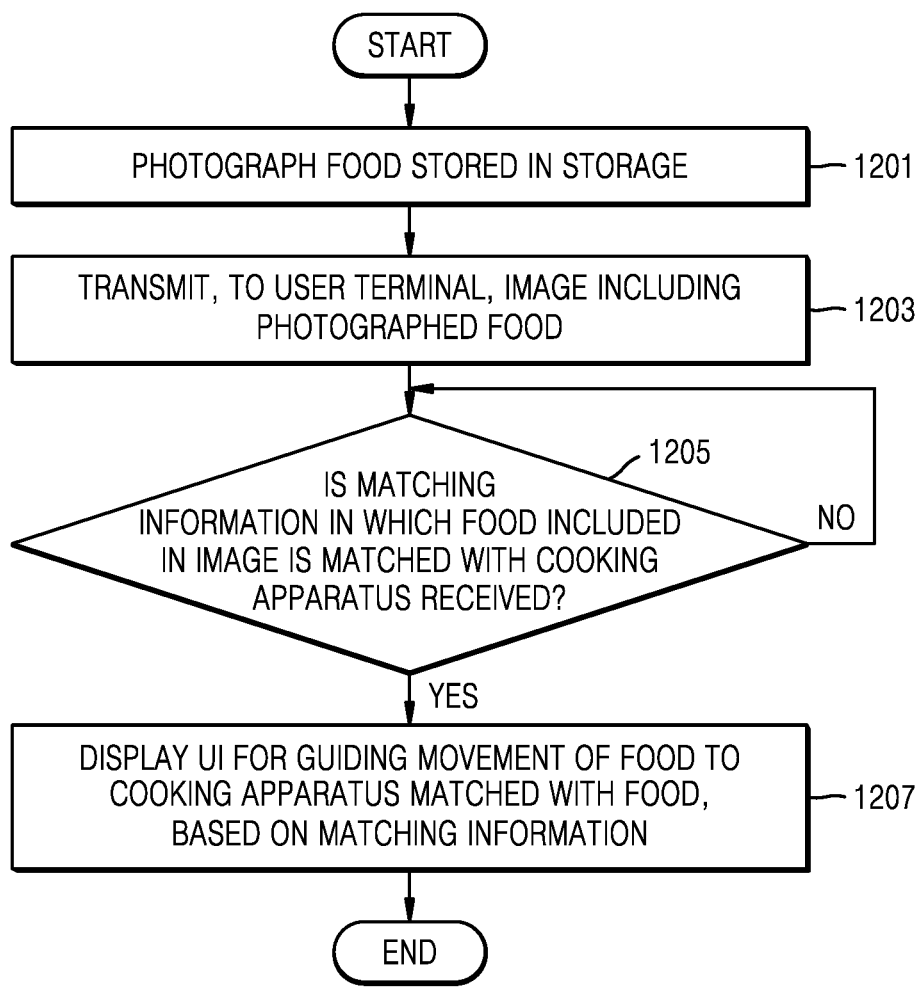
FIGS. 12 and 13 are flowcharts with respect to a refrigerator according to various embodiments of the present disclosure.

FIG. 12 is a flowchart with respect to a refrigerator according to various embodiments of the present disclosure.

In operation 1201, the refrigerator 10 may photograph food stored in a storage chamber thereof.

In operation 1203, the refrigerator 10 may transmit, to the user terminal 20, an image including the photographed food. For example, the refrigerator 10 may perform transmission to the user terminal 20 through a short-range or long-range network.

In operation 1205, the refrigerator 10 may determine whether to receive matching information in which the food included in the image is matched with a cooking apparatus, based on the transmission of the image.

When the matching information is received (1205-Y), in operation 1207, the refrigerator 10 may display a UI for guiding movement of the food to the cooking apparatus matched with the food, based on the matching information.

According to various embodiments, the refrigerator 10 may display a UI for guiding to control an operation of the cooking apparatus.

According to various embodiments, the refrigerator 10 may transmit, to the cooking apparatus, a control command for controlling an operation of the cooking apparatus.

According to various embodiments, in response to withdrawal of the food from the refrigerator 10 based on the guide, the refrigerator 10 may transmit, to the user terminal, notification information that the food has been moved.

Figure 13:
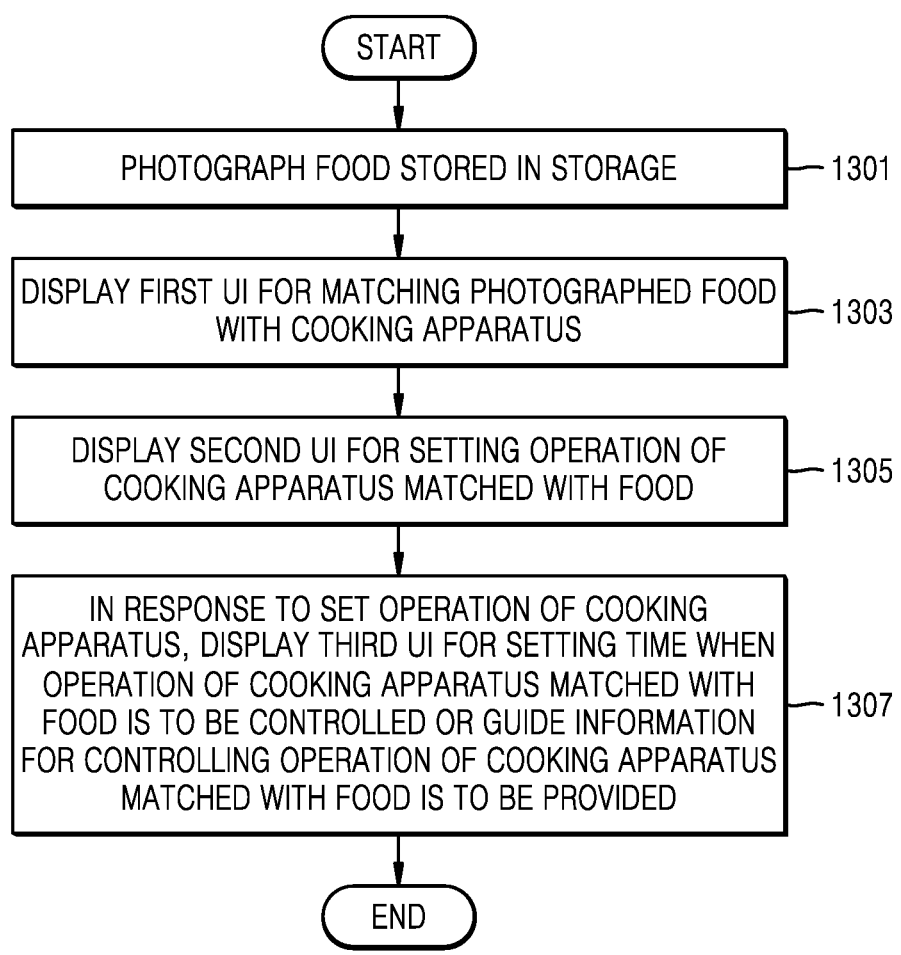

FIG. 13 is a flowchart with respect to a refrigerator according to various embodiments of the present disclosure.

In operation 1301, the refrigerator 10 may photograph food stored in a storage chamber thereof.

In operation 1303, the refrigerator 10 may display a first UI for matching the photographed food with a cooking apparatus.

In operation 1305, the refrigerator 10 may display a second UI for setting an operation of the cooking apparatus matched with the food.

In operation 1307, in response to the set operation of the cooking apparatus, the refrigerator 10 may display a third UI for setting a time at which the operation of the cooking apparatus matched with the food is to be controlled or guide information for controlling the operation of the matched cooking apparatus is to be provided.

According to various embodiments, when the set time comes, the refrigerator 10 may transmit, to the cooking apparatus, a control command for controlling the operation of the cooking apparatus.

According to various embodiments, when the set time comes, the refrigerator 10 may display a UI for guiding to control the operation of the cooking apparatus.

FIG. 14 is a flowchart with respect to a server according to various embodiments of the present disclosure.

In operation 1401, the server 40 may determine whether a request command for requesting an image including food is received from the user terminal 20.

When the request command is received (1401-Y), in operation 1403, the server 40 may transmit the request command to the refrigerator 10 corresponding to the user terminal 20.

Based on the transmission of the request command, the server 40 may determines in operation 1405 whether the image including the food is received from the refrigerator 10.

When the image including the food is received (1405-Y), in operation 1407, the server 40 may generate information related to a first UI for matching the food with a cooking apparatus for cooking the food.

In operation 1409, the server 40 may transmit the generated information related to the first UI to the user terminal 20.

Based on the transmission of the information related to the first UI, the server 40 may determines in operation 1411 whether user input information for matching the food with a cooking apparatus is received from the user terminal 20.

When the user input information is received (1411-Y), in operation 1413, the server 40 may generate matching information in which the food is matched with the cooking apparatus.

In operation 1415, the server 40 may generate information related to a second UI for setting an operation of the matched cooking apparatus. For example, upon receiving notification information that the food has been moved based on the information related to the first UI, the server 40 may generate the information related to the second UI for setting an operation of the cooking apparatus matched with the food.

In operation 1417, the server 40 may transmit the generated information related to the second UI to the user terminal 20.

Based on the transmission of the information related to the second UI, the server 40 may determines in operation 1419 whether user input information for setting an operation of the cooking apparatus matched with the food is received from the user terminal 20.

When the user input information is received (1419-Y), in operation 1421, the server 40 may transmit, to the cooking apparatus, a control command for controlling the operation of the cooking apparatus or transmit, to the refrigerator 10, guide information for controlling the operation of the cooking apparatus.

FIG. 15 is a flowchart with respect to a server according to various embodiments of the present disclosure.

In operation 1501, the server 50 may receive an image including food stored in a refrigerator and cooking apparatus information of a plurality of cooking apparatuses periodically or when an event occurs.

In operation 1503, the server 50 may determine a cooking apparatus for cooking the food included in the image among the plurality of cooking apparatuses and guide information for controlling an operation of the cooking apparatus, by applying the image and the cooking apparatus information of the plurality of cooking apparatuses to a learning model trained to determine a cooking apparatus by using an AI algorithm.

In operation 1505, the server 50 may transmit, to the refrigerator 10, matching information in which the food is matched with the cooking apparatus for cooking the food and guide information for controlling an operation of the cooking apparatus.

Figure 16A:
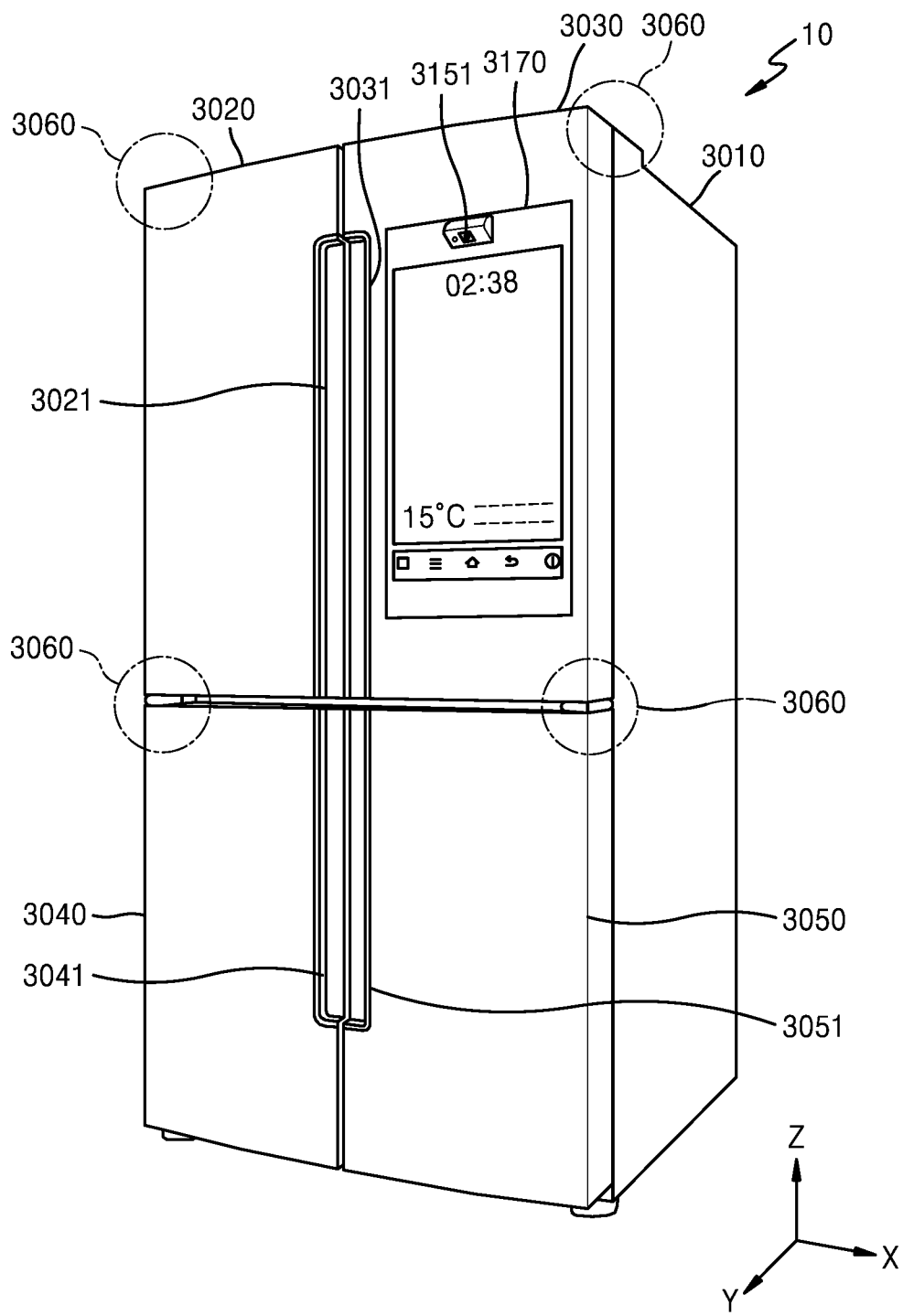
FIG. 16A is a perspective view of a refrigerator according to various embodiments of the present disclosure.
Figure 16B:
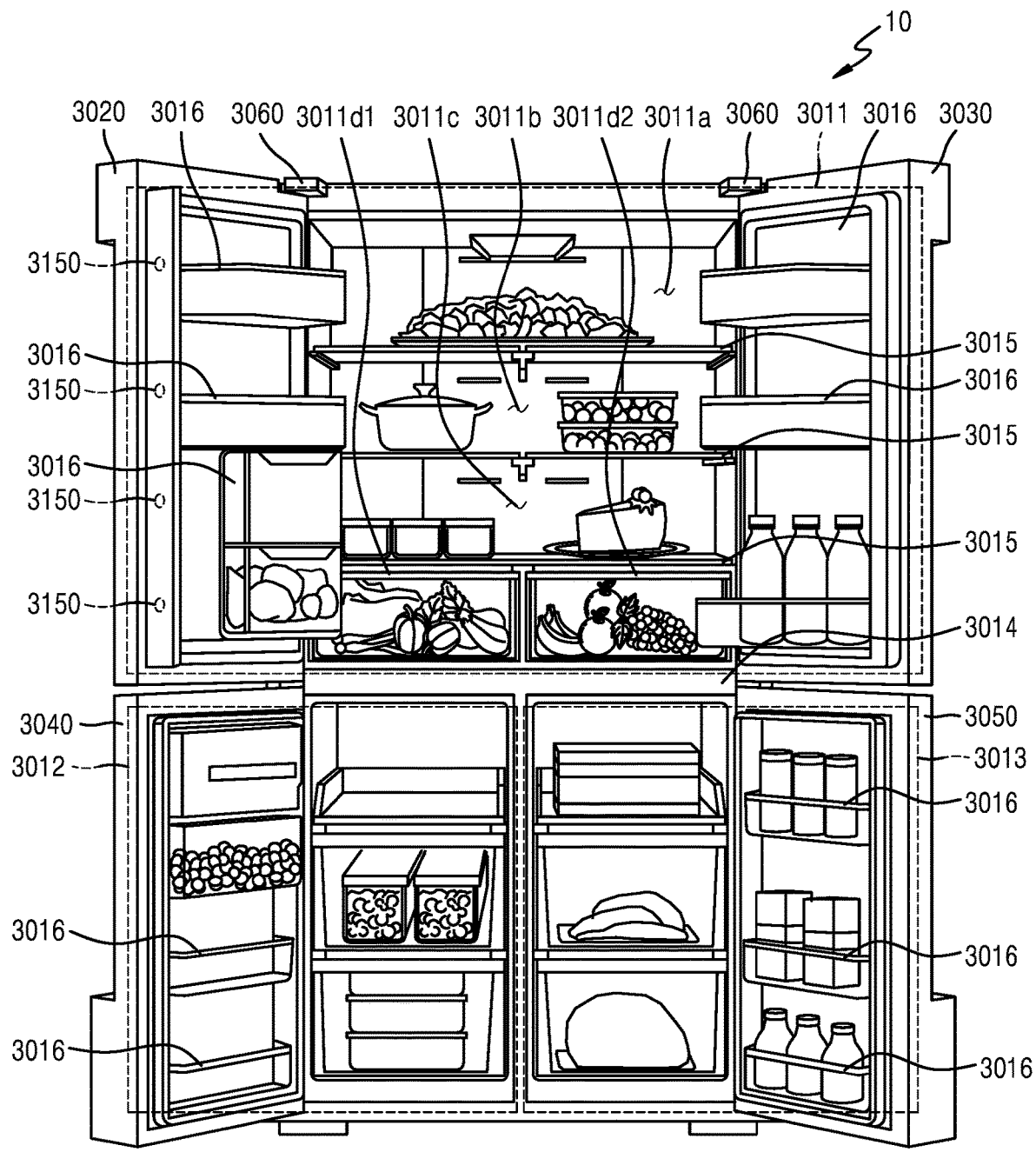
FIG. 16B is a front view of the refrigerator with all doors opened, according to various embodiments of the present disclosure.

FIG. 16A is a perspective view of a refrigerator including a front camera and a display, according to an embodiment of the present disclosure. FIG. 16B is a front view of the refrigerator with all doors opened, according to an embodiment of the present disclosure.

Referring to FIGS. 16A and 16B, the refrigerator 10 includes a main body 3010, storage chambers 3011, 3012, and 3013, doors 3020, 3030, 3040, and 3050, and hinges 3060 connecting each of the doors (3020 to 3050) to the main body 3010. The display (or a touch screen) 3170 configured to display content may be located on at least one door (e.g., at least one of a right door 3030 and a left door 3020) among a plurality of doors.

A camera (or a front camera) may be located on at least one door (e.g., at least one of the right door 3030 and the left door 3020) among the plurality of doors. A proximity sensor (not shown) may be located in the vicinity (e.g., within a radius of 500 mm) of the front camera (not shown). In addition, a microphone (not shown) may be located on at least one door (e.g., at least one of the right door 3030 and the left door 3020) among the plurality of doors.

A type of the refrigerator 10 may be identified according to shapes of storage chambers and doors. A top mounted freezer (TMF)-type refrigerator includes a freezing chamber formed at an upper side of a storage chamber vertically partitioned by a partition and a refrigerating chamber formed at a lower side of the storage chamber. A bottom mounted freezer (BMF)-type refrigerator includes a refrigerating chamber formed at an upper side of a storage chamber vertically partitioned by a partition and a freezing chamber formed at a lower side of the storage chamber.

A side by side (SBS)-type refrigerator includes a freezing chamber formed at one side of a storage chamber horizontally partitioned by a partition and a refrigerating chamber formed at the other side of the storage chamber. A French door refrigerator (FDR)-type refrigerator includes a refrigerating chamber formed at an upper side of a storage chamber vertically partitioned by a partition and a freezing chamber formed at a lower side of the storage chamber, wherein the refrigerating chamber formed at the upper side may be opened and closed by one pair of doors. In addition, in the FDR-type refrigerator, each of the refrigerating chamber formed at the upper side and the freezing chamber formed at the lower side may be opened and closed by one pair of doors.

The main body 3010 includes an inner case (not shown) forming the storage chambers 3011 to 3013, an outer case (not shown) forming an outline of the refrigerator, and an insulator (not shown) maintaining a temperature difference between the inner case and the outer case. The insulator may prevent cold air inside the storage chambers 3011 to 3013 from flowing to the outside and prevent external warm air from flowing into the inside of the storage chambers 3011 to 3013.

The main body 3010 includes a cold air supply unit configured to supply cold air to the storage chambers 3011 to 3013. The cold air supply unit may include a compressor 3181 (see FIG. 2) configured to compress a refrigerant, a condenser (not shown), an expansion valve (not shown), an evaporator (not shown), and a pipe.

The storage chambers 3011 to 3013 may be partitioned by a partition 3014. The storage chambers 3011 to 3013 are partitioned into freezing storage chambers 3012 and 3013 (hereinafter, referred to as "freezing chambers") at a lower side and a refrigerating storage chamber 3011 at an upper side (hereinafter, referred to as "refrigerating chamber"). The storage chamber 3012 may be set to a temperature of above zero (e.g., between 7° C. to 0° C.) or below zero (e.g., between −1° C. to −5° C.) such that water, beverage, food materials, and chilled or frozen food are stored therein. The water or the beverage may be stored in a beverage container.

The refrigerating chamber 3011 among the storage chambers 3011 to 3013 partitioned by the partition 3014 may include one or a plurality of shelves 3015 and one or a plurality of storage boxes 3016.

The refrigerating chamber 3011 is coupled to a first door 3020 at one side (e.g., to the left) of the storage chamber 3011 and a second door 3030 adjacent to the first door 3020 and located at the other side (e.g., to the right) of the storage chamber 3011. The first door 3020 and/or the second door 3030 may be rotated at a set angle (e.g., 300° or less) by each hinge 3060 to open or close the front surface of the storage chamber 3011. The first door 3020 may be rotated in an opposite direction to a rotating direction of the second door 3030 to open or close the storage chamber 3011. The locations of the first door 3020 and the second door 3030 may be exchanged.

The first door 3020 is rotated at the set angle (e.g., 300° or less) by the hinge 3060 to open or close a part of the front surface of the storage chamber 3011 (e.g., 35 to 70% of the front surface of the storage chamber 3011).

At a front surface (e.g., a +y-axis direction) of the first door 3020, a dispenser configured to provide water, ice, or sparkling water and/or a holdable handle 3021 may be located.

The second door 3030 is rotated at the set angle (e.g., 300° or less) by the hinge 3060 to open or close a part of the front surface of the storage chamber 3011 (e.g., 35 to 70% of the front surface of the storage chamber 3011). The second door 3030 may include a holdable handle 3031. The handle 3021 of the first door 3020 and the handle 3031 of the second door 3030 may be located apart to the left and the right with reference to a center region of the storage chamber 3011.

The display (or a touch screen) 3170 capable of displaying a function and a stored configuration of the refrigerator 10, receiving a user input (e.g., a touch or selection of a button (not shown)), and displaying (or executing) a screen image of an application (or including a widget) may be located on a front surface (e.g., the +y-axis direction) of the second door 3030. The button may be included in or separated from the display. The button may be a button displayed on the touch screen, a touch button, or a physical button.

Vegetable compartments 3011d1 and 3011d2 are located under the storage chamber 3011. The vegetable compartments 3011d1 and 3011d2 may be withdrawn (e.g., slid or rolled) in a forward direction (e.g., a y-axis direction).

The storage chamber 3012 may have the door 3040 at one side thereof. The storage chamber 3013 may have the door 3050 at one side thereof. The storage chambers 3012 and 3013 may be integrated to one storage chamber (e.g., like the storage chamber 3011). The one storage chamber may have doors at the left side and the right side thereof, respectively, like the storage chamber 3011). In addition, the refrigerator may have a drawer.

Figure 17:
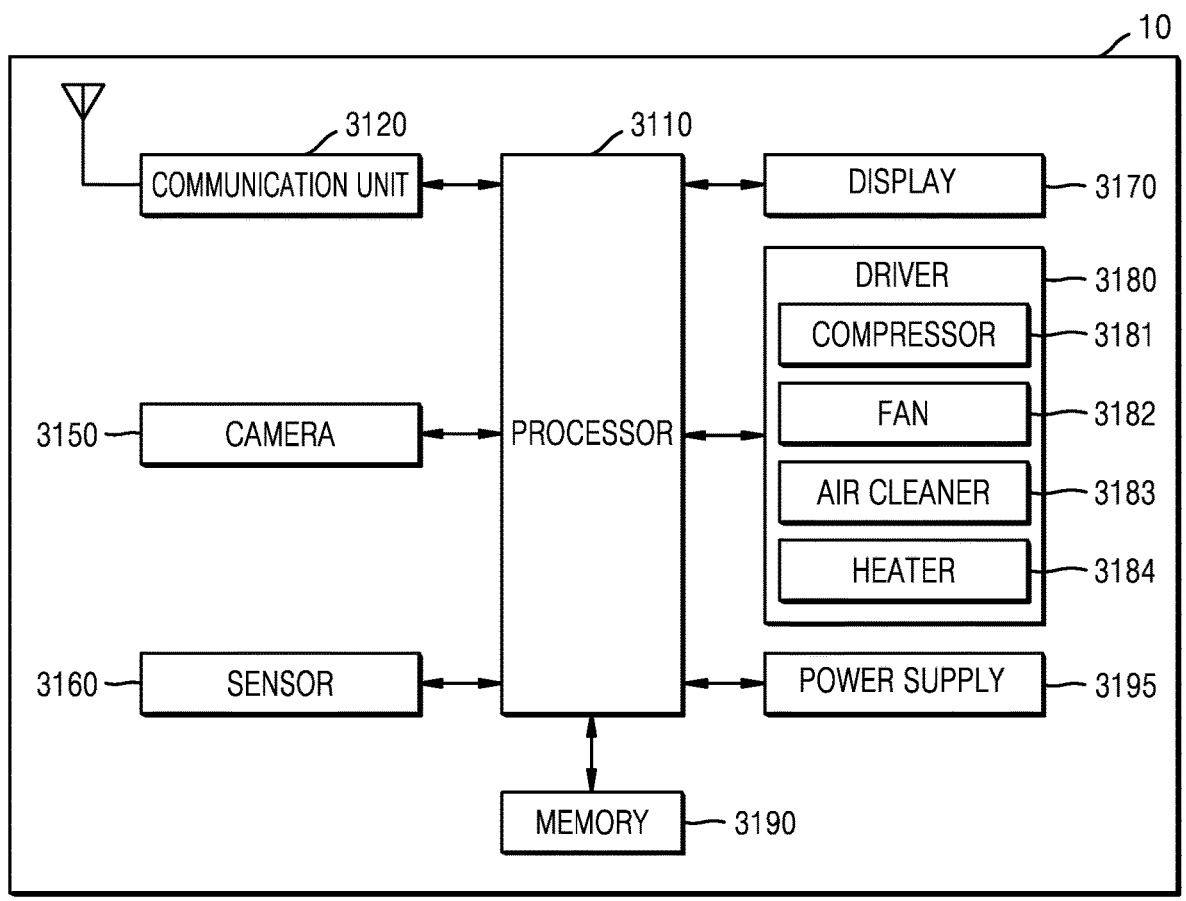
FIG. 17 is a block diagram of a refrigerator according to various embodiments of the present disclosure.

FIG. 17 is a block diagram of a refrigerator according to an embodiment of the present disclosure.

Referring to FIG. 17, the refrigerator 10 may be functionally connected to an external device by using the communication unit 3120. The external device may include at least one of the user terminal 20, the platform server 40, the AI server 50, or the cooking apparatus 30.

The refrigerator 10 may transmit, through the communication unit 3120, to the external device, operation information corresponding to an operation (e.g., adjustment of a temperature in each storage chamber or the like) of the refrigerator or state information corresponding to a state (e.g., normal, abnormal, or the like) of the refrigerator 10 or receive control information (e.g., a control command corresponding to rapid freezing of the refrigerator 10 or the like) from the external device.

The refrigerator 10 may include the processor 3110, the communication unit 3120, the camera 3150, a sensor 3160, the display 3170, a driver 3180, the memory 3190, and a power supply 3195.

The processor 3110 (or controller) may include one or a plurality of processors. In addition, the processor 3110 may include a nonvolatile memory including read-only memory (ROM) in which a control program for controlling the refrigerator 10 is stored and a volatile memory including random access memory (RAM) in which a signal or data input from the outside is stored, or which is used as a storage area for various tasks performed by the refrigerator 10. The RAM may be used as a storage area for control information received from the outside, operating information of the refrigerator 10, or state information of the refrigerator 10.

The processor 3110 may control a general operation of the refrigerator 10 and a signal flow between internal components of the refrigerator 10 and perform a function of processing data. The processor 3110 controls power to be supplied to the internal components by using the power supply 3195.

The processor 3110 may control the communication unit 3120, the camera 3150, the sensor 3160, the display 3170, the driver 3180, the memory 3190, and the power supply 3195.

According to an embodiment of the present disclosure, the processor 3110 may store, in the memory 3190, a food image including food photographed by the camera. In addition, the processor 3110 may control the display 3170 to display a food name corresponding to the food image.

According to another embodiment of the present disclosure, the processor 3110 may control the display 3170 to display a food name corresponding to the food image.

According to an embodiment of the present disclosure, the term 'processor of a refrigerator' may indicate the meaning including the processor 3110, ROM (not shown), and RAM (not shown). Alternatively, the term 'processor of a refrigerator' may indicate the processor 3110.

The communication unit 3120 may be connected, under control of the processor 3110, to an external device through a mobile communication network, a wireless local area network (LAN) communication network, or a short-range communication network by using one or more antennas. Wireless LAN communication may perform wireless connection to an access point (AP) at a place where the AP is provided, under control of the processor 3110. For example, wireless LAN communication may include Wi-Fi communication. Short-range communication may include Bluetooth communication, Bluetooth low energy communication, infrared data association (IrDA) communication, ultra-wideband (UWB) communication, magnetic security transmission (MST) communication, near fiend communication (NFC), and/or the like. According to various embodiments of the present disclosure, the term 'communication unit' may be connected to an external device through mobile communication, wireless LAN communication, and/or short-range communication.

The camera 3150 may capture a still image or a video under control of the processor 3110. The camera 3150 may capture a still image or a video for food registration and/or food management. The camera 3150 may photograph an iris of a user under control of the processor 3110. The camera 3150 includes a front camera located on a front surface of the refrigerator 10 and an internal camera located inside the refrigerator 10. Alternatively, an iris photographing camera configured to photograph an iris of a user may be located at one side of the front camera.

The front camera may be tilted at a set angle (e.g., 85° or less) in a forward direction (e.g., the +y-axis direction) with reference to a front surface of a door of the refrigerator 10. The set angle may be 75° or less and 35° or more. Alternatively, the set angle may be 65° or less and 15° or more.

One of the front camera and the internal camera may include an auxiliary light source (e.g., a flashlight) configured to provide the intensity of light required for photographing. Alternatively, an auxiliary light source (e.g., a light-emitting diode (LED) for iris recognition) (not shown) required to photograph an iris may be located on the front surface of the refrigerator 10.

One or more front cameras may be included. One or more internal cameras may be located on a rear surface of the doors 3020 to 3050 facing the storage chambers 3011 to 3013, according to an area of the storage chambers. For example, one or more internal cameras may be located on the rear surface of the doors 3020 and 3030 facing the storage chamber 3011. One or more internal cameras may be located on the rear surface of the door 3040 facing the storage chamber 3012. In addition, one or more internal cameras may be located on the rear surface of the door 3050 facing the storage chamber 3013.

The processor 3110 may perform a control such that an image captured using one of the front camera and the internal camera is stored in the memory 3190.

The sensor 3160 may detect a peripheral state (e.g., an illuminance and the like) of the refrigerator 10 and/or an internal state (e.g., a storage chamber temperature and the like) of the refrigerator 10 by using one or more sensors.

The sensor 3160 may include at least one of a proximity sensor configured to detect whether a user approaches the refrigerator 10 and one or more temperature sensors configured to detect a temperature in a storage chamber (e.g., a freezing chamber, a refrigerating chamber, a vegetable compartment, and the like) of the refrigerator 10. In addition, the display 3170 may include an illuminance sensor configured to detect the intensity of light around the refrigerator 10, which corresponds to a brightness change. One of the proximity sensor and the illuminance sensor in the sensor 3160 may be located on the front surface of a door of the refrigerator 10. In addition, the temperature sensor may be located in the inside corresponding to a storage chamber.

It could be easily understood to those of ordinary skill in the art that types of sensors included in the sensor 3160 may be added, changed, or removed according to the performance of the refrigerator 10.

The display 3170 may provide (or display) a GUI corresponding to various services (e.g., a voice call, a video call, data transmission, broadcast reception, photographing, video content viewing, an electronic payment including a mobile payment, or the like). According to an embodiment of the present disclosure, the display 3170 may include a touch screen.

The touch screen may be implemented by an integrated type of a display panel and a touch panel 172 (e.g., an in-cell touch screen or an on-cell touch screen).

The touch screen may include an edge touch panel configured to receive a user input and an edge display panel configured to display a screen image. The edge touch panel and the edge display panel may also be implemented by the integrated type described above.

The touch screen may transmit, to a touchscreen controller, an analog signal corresponding to a single touch or a multi-touch input through a home screen image or a GUI The touch screen may receive a single touch or a multi-touch through a body part (e.g., a finger including the thumb) of a user or an input pen (e.g., a stylus pen) (not shown).

According to an embodiment of the present disclosure, the touch screen may output a visual feedback corresponding to a stored location indication of a determined food in a storage chamber.

The driver 3180 may include at least one of the compressor 3181, a fan 3182, a filter 3183, and a heater 3184. The driver 3180 may further include a lamp (or a deodorizer).

The compressor 3181 compresses a refrigerant that is an operational fluid of a cooling cycle under control of the processor 3110. The cooling cycle comprises a condenser configured to convert a gaseous refrigerant compressed by the compressor 3181 into a liquid refrigerant, an expander configured to decompress the liquid refrigerant, and an evaporator configured to evaporate the decompressed liquid refrigerant. The processor 3110 may control a temperature in a storage chamber by evaporating the liquid refrigerant. Alternatively, the refrigerator 10 may control a temperature in a storage chamber by using a Peltier element using a Peltier effect or a magnetic cooling device using a magnetocaloric effect.

The fan 3182 may circulate external air under control of the processor 3110. Air heated by a cooling cycle may be cooled down through heat exchange with the external air.

The air cleaner 3183 may sterilize (or remove) germs floating in or attached to a storage chamber under control of the processor 3110. The air cleaner 3183 may include an ion sterilization cleaner.

The heater 3184 defrosts under control of the processor 3110. The heater 3184 may include a defrosting heater.

The memory (or a storage unit) 3190 may store a signal or data input/output in correspondence to an operation of a component (e.g., corresponding to food management (or food recognition)), under control of the processor 3110. The memory 3190 may store a GUI related to a control program for a control of the refrigerator 10 or the processor 3110 and an application (e.g., a food management application, a food recognition application, or the like) provided from a manufacturer or downloaded from the outside, images corresponding to the GUI, user information, documents, databases, or related data.

The memory 3190 may store a food image (or video) captured by the camera 3150. The food image may include a binary file corresponding to one or more images displayed on the display 3170 and one or more images stored in the memory 3190. In addition, the memory 3190 may store various types of comparative food images corresponding to a comparison with a captured food image (or video). The various types of comparative food images may include many (e.g., tens to hundreds) food images for each food type. When the captured food image (or video) is carrot, comparative food images may include carrot images of various carrot shapes, sizes, colors, cleaned states, packed/unpacked states, or the like.

The memory 3190 may store various training data corresponding to food recognition to recognize or identify) a captured food image. For example, carrot images of various carrot shapes, sizes, colors, cleaned states, packed/unpacked states, or the like may be stored in the memory 3190 as training data to recognize carrot. Training data corresponding to food which a user can eat, drink or cook, such as not only fruits but also vegetables, meat, and fish, may be stored in the memory 3190. In addition, the memory 3190 may store a learning model for recognizing a captured food image.

The memory 3190 may store a food image (or video) captured by the camera 3150 and a food recognition application (or a separated application using a food recognition algorithm) for identifying food from the captured food image through machine learning. The memory 3190 may store the entire food recognition application, or a part of the food recognition application may be stored in an external device (e.g., a server or a portable device), and the other part of the food recognition application may be stored in the memory 3190. In addition, a part of the training data corresponding to food recognition may be stored in the memory 3190, and the other part of the training data may be stored in an external device (e.g., a server or a portable device). The processor 3110 may recognize (or identify) food from a food image captured by the camera 3150, by using the food recognition application.

According to an embodiment of the present disclosure, the memory 3190 may store at least one instruction configured for the processor 3110 to: control the camera 3150 to photograph food stored in a storage chamber; control the communication unit 3120 to transmit an image including the photographed food to the user terminal 20; and control the display 3170 to display, upon receiving matching information in which the food included in the image is matched with a cooking apparatus, based on the transmission of the image, a UI for guiding movement of the food to the cooking apparatus based on the matching information.

According to another embodiment of the present disclosure, the memory 3190 may store at least one instruction configured for the processor 3110 to control the display 3170 to display a UI for guiding to control an operation of the cooking apparatus.

According to another embodiment of the present disclosure, the memory 3190 may store at least one instruction configured for the processor 3110 to control the communication unit 3120 to transmit, to the cooking apparatus, a control command for controlling the operation of the cooking apparatus.

According to another embodiment of the present disclosure, the memory 3190 may store at least one instruction configured for the processor 3110 to control the communication unit 3120 to transmit notification information that the food has been moved to the user terminal 20 in response to withdrawal of the food from the refrigerator 10 based on the guide.

According to another embodiment of the present disclosure, the memory 3190 may store at least one instruction configured for the processor 3110 to: control the display 3170 to display a first UI for matching the photographed food with a cooking apparatus; control the display 3170 to display a second UI for setting an operation of the matched cooking apparatus; and control the display 3170 to display a third UI for setting, according to the set operation, a time at which the operation of the matched cooking apparatus is to be controlled or guide information for controlling the operation of the matched cooking apparatus is to be provided.

According to another embodiment of the present disclosure, the memory 3190 may store at least one instruction configured for the processor 3110 to control the communication unit 3120 to transmit, to the cooking apparatus, a control command for controlling the operation of the cooking apparatus, when the set time comes.

According to another embodiment of the present disclosure, the memory 3190 may store at least one instruction configured for the processor 3110 to control the display 3170 to display a UI for guiding to control the operation of the cooking apparatus, when the set time comes.

According to an embodiment of the present disclosure, the term 'memory' includes ROM in the processor 3110, RAM, or a memory card (e.g., a micro secure digital (SD) card, or the like) (not shown) insertable into a slot (not shown) of the refrigerator 10. The memory 3190 may include a nonvolatile memory, a volatile memory, a hard disk drive (HDD), or a solid state drive (SDD).

The power supply 3195 may supply power to components of the refrigerator 10 under control of the processor 3110. The power supply 3195 may supply power input from an external power source through a power cord to each component of the refrigerator 10 under control of the processor 3110.

It could be easily understood to those of ordinary skill in the art that at least one of the aforementioned components of the refrigerator 10 may be added, removed, or changed according to the performance of the refrigerator 10.

Figure 18:
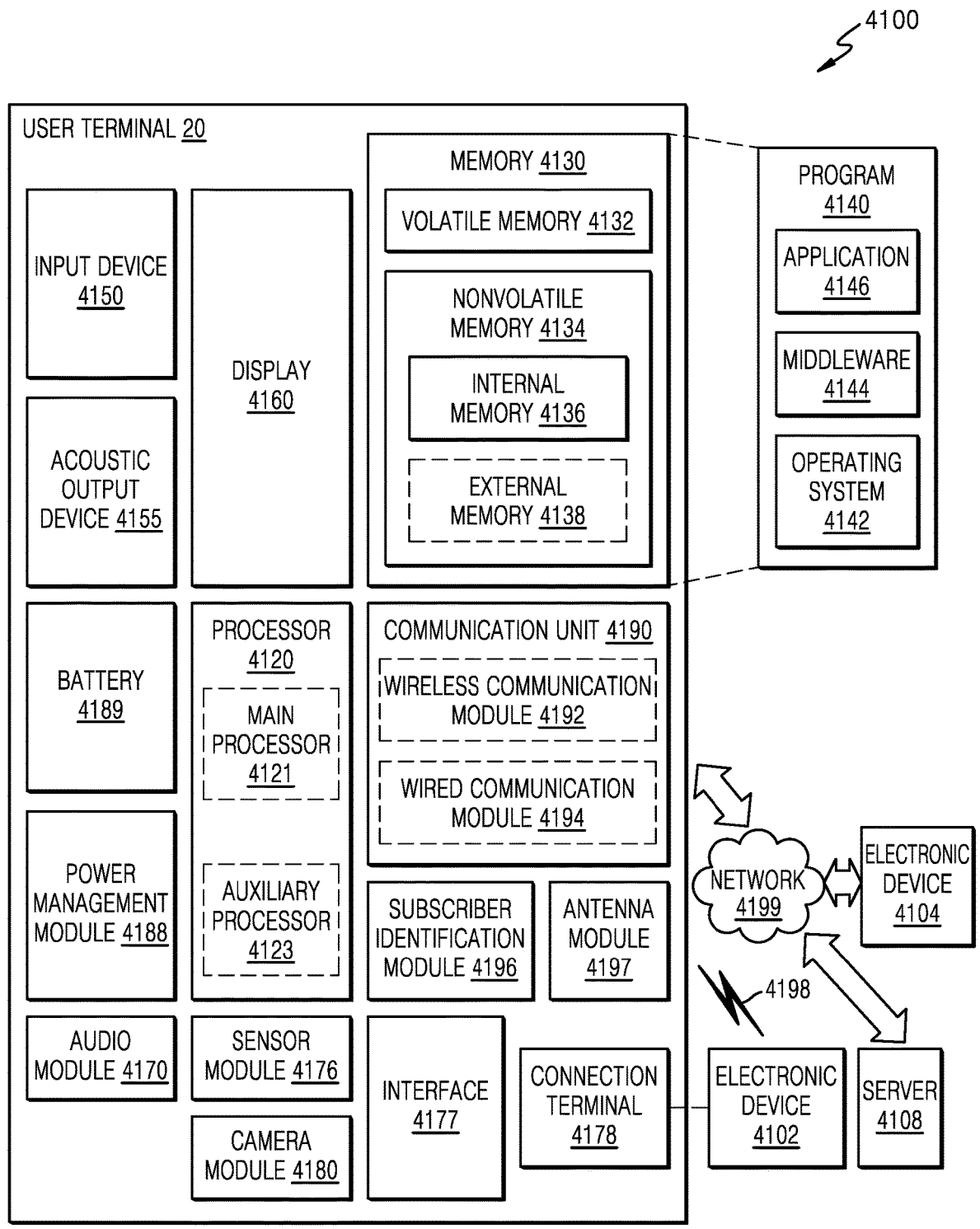
FIG. 18 is a block diagram of a user terminal in a network environment, according to various embodiments of the present disclosure.

FIG. 18 is a block diagram of the user terminal 20 in a network environment 4100, according to various embodiments. Referring to FIG. 18, in the network environment 4100, the user terminal 20 may communicate with an external device 4102 through a first network 4198 (e.g., short-range wireless communication) or communicate with an external device 4104 or a server 4108 through a second network 4199 (e.g., long-range wireless communication). The external device 4102 or 4104 may be, for example, the refrigerator 10 or a cooking apparatus according to the present disclosure. The server 4108 may be, for example, the platform server 40 or the AI server 50 according to the present disclosure.

According to an embodiment, the user terminal 20 may communicate with the electronic device 4104 via the server 4108. According to an embodiment, the user terminal 20 may include the processor 4120, the memory 4130, an input device 4150, an acoustic output device 4155, the display 4160, an audio module 4170, a sensor module 4176, an interface 4177, a camera module 4180, a power management module 4188, a battery 4189, the communication unit 4190, a subscriber identification module 4196, and an antenna module 4197. According to some embodiments, at least one (e.g., the display 4160 or the camera module 4180) of these components may be omitted, or another component may be added to these components. According to some embodiments, for example, some components may be integrated and implemented such that the sensor module 4176 (e.g., a fingerprint sensor, an iris sensor, or an illumination sensor) is embedded in the display 4160 (e.g., a display).

The processor 4120 may control at least one other component (e.g., a hard or software component) of the user terminal 20 connected to the processor 4120 and perform various kinds of data processing and computation, by driving, for example, software (e.g., a program 4140). The processor 4120 may load, in a volatile memory 4132, a command or data received from another component (e.g., the sensor module 4176 or the communication unit 4190), process the received command or data, and store result data in a nonvolatile memory 4134. According to an embodiment, the processor 4120 may include a main processor 4121 (e.g., a central processing unit or an application processor) and an auxiliary processor 4123 (e.g., a graphics processing unit, an image signal processor, a sensor hub processor, or a communication processor) operating independently to the main processor 4121 and additionally or substitutionally using lower power than the main processor 4121 or specified to a designated function. Herein, the auxiliary processor 4123 may be separated from or embedded in the main processor 4121.

In this case, the auxiliary processor 4123 may control at least some of functions or states related to at least one component (e.g., the display 4160, the sensor module 4176, or the communication unit 4190) among the components of the user terminal 20, for example, instead of the main processor 4121 during an inactive (e.g., sleep) state of the main processor 4121 or together with the main processor 4121 during an active (e.g., application executing) state of the main processor 4121. According to an embodiment, the auxiliary processor 4123 (e.g., an image signal processor or a communication processor) may be implemented as a partial component of another functionally related component (e.g., the camera module 4180 or the communication unit 4190).

The memory 4130 may store various data, e.g., input data or output data for software (e.g., the program, 4140) and a command related to the software, used by at least one component (e.g., the processor 4120 or the sensor module 4176) of the user terminal 20. The memory 4130 may include the volatile memory 4132 or the nonvolatile memory 4134.

The program, 4140 is software stored in the memory 4130 and may include, for example, an operating system 4142, middleware 4144, or an application 4146.

According to an embodiment of the present disclosure, the memory 4130 may store at least one instruction configured for the processor 4120 to: control the display 4160 to display, upon receiving, through the communication unit 4190, an image including food stored in a refrigerator, a first UI for matching the food with a cooking apparatus for cooking the food; in response to a user input, on the first UI, for matching the food with a cooking apparatus, generate matching information in which the food is matched with the cooking apparatus; control the display 4160 to display a second UI for setting an operation of the matched cooking apparatus; and in response to a user input, on the second UI, for matching the food with a cooking apparatus, perform at least one of a function of controlling the operation of the cooking apparatus and a function of transmitting guide information for controlling the operation of the cooking apparatus.

The input device 4150 receives, from the outside (e.g., a user), a command or data to be used for a component (e.g., the processor 4120) of the user terminal 20 and may include, for example, a microphone, a mouse, or a keyboard.

The acoustic output device 4155 outputs an acoustic signal to the outside of the user terminal 20 and may include, for example, a speaker used for a general use such as multimedia playback or recording playback and a receiver used for call reception exclusive. According to an embodiment, the receiver may be integrated with or separated from the speaker.

The display 4160 visually provides information to a user of the user terminal 20 and may include, for example, a display, a hologram device, or a projector and a control circuit for controlling a corresponding device. According to an embodiment, the display 4160 may include a touch circuitry or a pressure sensor capable of measuring a strength of pressure of a touch.

The audio module 4170 may convert a sound into an electrical signal and vice versa. According to an embodiment, the audio module 4170 may acquire a sound through the input device 4150 or output a sound through the acoustic output device 4155 or an external electronic device (e.g., the external device 4102 (e.g., a speaker or headphones)) connected to the user terminal in a wired or wireless manner.

The sensor module 4176 may generate an electrical signal or a data value corresponding to an internal operating state (e.g., power or a temperature) or an external environment state of the user terminal 20. The sensor module 4176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 4177 may support a designated protocol by which the user terminal 20 is connectable to an external electronic device (e.g., the external device 4102) in a wired or wireless manner. According to an embodiment, the interface 4177 may include a high definition multimedia interface (HDMI), a universal serial bus (USB) interface, an SD card interface, or an audio interface.

A connection terminal 4178 may include a connector, e.g., an HDMI connector, a USB connector, an SD card connector, or an audio connector (e.g., a headphone connector), capable of connecting the user terminal 20 to an external electronic device (e.g., the external device 4102).

The camera module 4180 may capture a still image or a video. According to an embodiment, the camera module 4180 may include one or more lenses, an image sensor, an image signal processor, or a flash.

The power management module 4188 manages power supplied to the user terminal 20 and may be configured as at least a part of, for example, a power management integrated circuit (PMIC).

The battery 4189 supplies power to at least one component of the user terminal 20 and may include, for example, a primary battery which cannot be recharged, a rechargeable secondary battery, or a fuel cell.

The communication unit 4190 may establish a wired or wireless communication channel between the user terminal 20 and an external electronic device (e.g., the external device 4102, the external device 4104, or the server 4108) and support communication through the established communication channel. The communication unit 4190 may include at least one communication processor operating independently to the processor 4120 (e.g., an application processor) and supporting wired communication or wireless communication. According to an embodiment, the communication unit 4190 may include a wireless communication module 4192 (e.g., a cellular communication module, a short-range wireless communication module, or a global navigation satellite system (GNSS) communication module) or a wired communication module 4194 (e.g., a LAN communication module or a power line communication module) and communicate with an external electronic device through the first network 4198 (e.g., a short-range communication network such as a Bluetooth, WiFi Direct, or IrDA network) or the second network 4199 (e.g., a long-range communication network such as a cellular network, the Internet, or a computer network (e.g., a LAN or a wide area network (WAN)). The communication unit 4190 having the various types of communication modules described above may be implemented by a single chip or respective separate chips.

According to an embodiment, the wireless communication module 4192 may identify and authenticate the user terminal 20 in a communication network by using user information stored in the subscriber identification module 4196.

The antenna module 4197 may include one or more antennas for transmitting or receiving a signal or power to or from the outside. According to an embodiment, the communication unit 4190 (e.g., the wireless communication module 4192) may transmit or receive a signal to or from an external electronic device through an antenna suitable for a communication scheme.

Some of the components may exchange a signal (e.g., a command or data) therebetween by being connected to each other through a peripheral communication scheme (e.g., a bus, a general purpose input/output (GPIO), a serial peripheral interface (SPI), or a mobile industry processor interface (MIPI)).

According to an embodiment, the command or data may be transmitted or received between the user terminal 20 and the external device 4104 through the server 4108 connected to the second network 4199. Each of the external devices 4102 and 4104 may be the same or different type of device as or from the user terminal 20. The external device 4102 or 4104 may be, for example, the refrigerator 10 or a cooking apparatus according to the present disclosure. The server 4108 may be, for example, the platform server 40 or the AI server 50 according to the present disclosure.

According to an embodiment, all or some of operations executed by the user terminal may be executed by one or more other external electronic devices. According to an embodiment, when the user terminal 20 has to perform a certain function or service automatically or by a request, the user terminal 20 may request an external electronic device for at least a partial function associated with the function or service instead of executing the function or service by the user terminal 20 or additionally. The external electronic device which has received the request may execute the request function or an additional function and transmit the execution result to the user terminal 20. The user terminal 20 may provide the requested function or service by processing the received result as it is or additionally. To this end, for example, cloud computing, distributed computing, or client-server computing technology may be used.

The user terminal 20 according to various embodiments disclosed in the present disclosure may be various types of devices. The user terminal 20 may include at least one of, for example, a portable communication device (e.g., a smartphone), a computer device, a portable multimedia device, a portable medical device, a camera, a wearable device, or a home appliance. An electronic device according to an embodiment of the present disclosure is not limited to the devices described above.

The terminology used in the present disclosure is used only to describe embodiments and does not have any intention to limit the present disclosure. An expression in the singular includes an expression in the plural unless they are clearly different from each other in context. In the application, it should be understood that terms, such as "include" and "have", are used to indicate the existence of an implemented feature, number, step, operation, element, part, or a combination thereof without excluding in advance the possibility of the existence or addition of one or more other features, numbers, steps, operations, elements, parts, or combinations thereof.

It should be understood that various embodiments of the present disclosure and terms used therein do not limit the description in the present disclosure to a specific disclosing form but include every modified, equivalent, and/or replaced one of a corresponding embodiment. In the description of the drawings, like reference numerals denote like elements. An expression in the singular includes an expression in the plural unless they are clearly different from each other in context. Throughout the present disclosure, the expression "A or B", "at least one of A and/or B", "A, B, or C", "at least one of A, B, and/or C", or the like mat include all possible combinations of the items listed together. The expressions, such as "first" and "second", can describe corresponding elements without regarding to sequence or importance and do not limit corresponding elements but are used only to classify a certain element from another element. When it is described that a certain (e.g., a first) element is "(functionally or communicatively) connected" or "linked" to another (e.g., a second) element, the certain element may be connected or linked to another element directly or via another element (e.g., a third element) in the middle.

The term "module" used in the present disclosure includes hardware, software, or firmware and may be used compatibly with the term, e.g., a logic, a logical block, a part, a circuit, or the like. A module may be an integrally constructed part, a minimum unit capable of performing one or more functions, or a part thereof. For example, a module may include an application-specific integrated circuit (ASIC).

Various embodiments of the present disclosure may be implemented by software including instructions stored in machine (e.g., computer)-readable storage media. The machine is a device capable of calling a stored instruction from the storage media and operating according to the called instruction and may include the refrigerator 10, the user terminal 20, the cooking apparatus 30, the platform server 40, and the AI server 50 according to embodiments of the present disclosure. When a command is executed by a processor, the processor may perform a function corresponding to the command directly or by using other elements under control of the processor. The command may include code generated or executed by a compiler or an interpreter. The machine-readable storage media may be provided in a form of non-transitory storage media. Herein, 'non-transitory' only indicates that the storage media do not include a signal but are tangible but does not indicate that data is semi-permanently or temporarily stored in the storage media.

According to an embodiment, the methods according to various embodiments of the present disclosure may be provided by being included in a computer program product. The computer program product may be traded between a seller and a purchaser. The computer program product may include a program which can be transmitted through a storage medium (e.g., compact disc read only memory (CD-ROM)) or a wired/wireless network. For example, the computer program product may be electronically distributed through an application store (e.g., PlayStore™). For the electronic distribution, at least a portion of the computer program product may be at least temporarily stored in a storage medium, such as a server of a manufacturer, a server of an application store, or a memory of a relay server, or generated. The machine (e.g., the refrigerator 10, the user terminal 20, the cooking apparatus 30, the platform server 40, or the AI server 50) of the present disclosure may download and install the computer program product through an application store and perform the various embodiments of the present disclosure by using the downloaded computer program product.

Each of components (e.g., modules or programs) according to various embodiments may include one or more entities, and some of corresponding sub-components described above may be omitted, or another sub-component may be further included in various embodiments. Substitutionally or additionally, some components (e.g., modules or programs) may be integrated into one entity and perform the same or similar function performed by each corresponding component before the integration. Operations performed by modules, programs, or other components, according to various embodiments, may be executed sequentially, in parallel, repeatedly, or heuristically, or at least some operations may be executed in another order, omitted, or added to another operation.

What is claimed is:

1. A method of performing, by a user terminal, a function, the method comprising:
   displaying, upon receiving a captured image including at least one food in a refrigerator, a first user interface for matching the at least one food with a cooking apparatus for cooking the at least one food, wherein the first user interface includes the captured image and identification information of the cooking apparatus;
   in response to a user input of matching a food with the cooking apparatus by selecting the food from among the at least one food in the captured image and selecting the identification information of the cooking apparatus, on the first user interface, generating matching information in which the selected food is matched with the cooking apparatus;
displaying a second user interface for setting an operation of the cooking apparatus matched with the selected food; and
performing at least one of a function of controlling the operation of the cooking apparatus or a function of transmitting guide information for controlling the operation of the cooking apparatus, in response to a user input, on the second interface, for setting the operation of the cooking apparatus.

2. The method of claim 1, wherein the function of controlling the operation of the cooking apparatus comprises transmitting, to the cooking apparatus, a control command for controlling the operation of the cooking apparatus.

3. The method of claim 1, wherein the function of transmitting guide information for controlling the operation of the cooking apparatus comprises transmitting the guide information to the cooking apparatus.

4. The method of claim 1, wherein the image including the food is captured in the refrigerator.

5. The method of claim 1, further comprising transmitting the generated matching information to the refrigerator,
wherein the displaying of the second user interface comprises displaying the second user interface for setting an operation of the cooking apparatus matched with the food, based on receiving, from the refrigerator storing the food or the cooking apparatus, notification information that the food has been moved from the refrigerator.

6. The method of claim 5, further comprising displaying a notification message that the food has been moved, based on receiving the notification information.

7. The method of claim 1, further comprising determining at least one cooking apparatus matchable with the food from among a plurality of cooking apparatuses,
wherein the displaying of the first user interface comprises displaying the first user interface including the food and the determined at least one cooking apparatus.

8. The method of claim 1, wherein the displaying of the first user interface comprises:
displaying a user interface for matching a plurality of foods with a plurality of cooking apparatuses; and
displaying a user interface for changing a cooking sequence of each of the matched plurality of foods and each of the plurality of cooking apparatuses.

9. A server comprising:
a communication circuit configured to transmit, upon receiving, from a user terminal, a request command requesting a captured image including at least one food in a refrigerator, the request command to the refrigerator corresponding to the user terminal and
receive, from the refrigerator, the captured image including the at least one food; and
a processor configured to generate information related to a first user interface for matching the at least one food in the captured image with a cooking apparatus for cooking the at least one food, wherein the first user interface includes the captured image and identification information of the cooking apparatus,
wherein the processor is further configured to:
transmit, through the communication circuit, the generated information related to the first user interface to the user terminal;
based on the information related to the first user interface, in response to a user input of matching a food with the cooking apparatus by selecting the food from among the at least one food in the captured image and selecting the identification information of the cooking apparatus, generate matching information in which the selected food is matched with the cooking apparatus;
generate information related to a second user interface for setting an operation of the cooking apparatus matched with the selected food;
transmit, through the communication circuit, the generated information related to the second user interface to the user terminal; and
transmit, to the refrigerator, guide information for controlling the operation of the cooking apparatus, in response to a user input for setting the operation of the cooking apparatus based on the information related to the second user interface.

10. The server of claim 9, wherein the processor is further configured to generate the information related to the second user interface for setting an operation of the cooking apparatus matched with the food, based on receiving notification information that the food has been moved to the cooking apparatus.

11. A computer program product comprising a non-transitory computer-readable recording medium comprising at least one instruction to be executed by a processor of a computer to:
upon receiving a captured image including at least one food in a refrigerator, display a first user interface for matching the at least one food with a cooking apparatus for cooking the at least one food, wherein the first user interface includes the captured image and identification information of the cooking apparatus;
in response to a user input of matching a food with the cooking apparatus by selecting the food from among the at least one food in the captured image and selecting the identification information of the cooking apparatus, on the first user interface, generate matching information for matching the selected food with the cooking apparatus;
display a second user interface for setting an operation of the cooking apparatus matched with the selected food; and
perform at least one of a function of controlling the operation of the cooking apparatus or a function of transmitting guide information for controlling the operation of the cooking apparatus, in response to a user input, on the second user interface, for setting the operation of the cooking apparatus.

12. A refrigerator comprising:
a display;
a storage chamber storing food therein;
a temperature sensor configured to detect a temperature in the storage chamber;
a compressor and fan configured to supply cold air to the storage chamber;
a camera configured to photograph food in the storage chamber;
a communication circuit configured to communicate with a user terminal;
at least one processor electrically connected to the temperature sensor, the camera, the cooler, and the communication circuit; and
a memory electrically connected to the at least one processor,
wherein the memory stores at least one instruction to be executed by the processor to:

control the camera to photograph at least one food stored in the storage chamber;

control the communication circuit to transmit a captured image including the photographed at least one food to the user terminal;

control, upon receiving, based on the transmission of the captured image, matching information for matching a food from among the at least one food included in the captured image with a cooking apparatus, the display to display a user interface for guiding movement of the food to the cooking apparatus matched with the food, based on the matching information.

13. The refrigerator of claim 12, wherein the memory stores at least one instruction to be executed by the processor to control the display to display a user interface for guiding a user to operate the cooking apparatus matched with the food.

14. The refrigerator of claim 12, wherein the memory stores at least one instruction to be executed by the processor to control the communication circuit to transmit, to the cooking apparatus, a control command for controlling an operation of the cooking apparatus matched with the food.

15. The refrigerator of claim 12, wherein the memory stores at least one instruction to be executed by the processor to control the communication circuit to transmit, to the user terminal, notification information that the food has been moved, in response to withdrawal of the food from the refrigerator.

16. The method of claim 1, wherein the function of transmitting guide information for controlling the operation of the cooking apparatus comprises transmitting the guide information to the refrigerator storing the food.

* * * * *